US011027514B2

(12) United States Patent
Bargatin et al.

(10) Patent No.: US 11,027,514 B2
(45) Date of Patent: Jun. 8, 2021

(54) ULTRATHIN HOLLOW PLATES AND THEIR APPLICATIONS

(71) Applicant: THE TRUSTEES OF THE UNIVERSITY OF PENNSYLVANIA, Philadelphia, PA (US)

(72) Inventors: Igor Bargatin, Wynnewood, PA (US); Chen Lin, Santa Clara, CA (US); Samuel Nicaise, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 161 days.

(21) Appl. No.: 15/998,451

(22) Filed: Aug. 15, 2018

(65) Prior Publication Data

US 2019/0070824 A1    Mar. 7, 2019

Related U.S. Application Data

(60) Provisional application No. 62/545,754, filed on Aug. 15, 2017.

(51) Int. Cl.
*B32B 3/12* (2006.01)
*B32B 3/26* (2006.01)

(52) U.S. Cl.
CPC ............... *B32B 3/12* (2013.01); *B32B 3/266* (2013.01); *B32B 2255/26* (2013.01)

(58) Field of Classification Search
None
See application file for complete search history.

(56) References Cited

U.S. PATENT DOCUMENTS

| 2009/0161058 A1* | 6/2009 | Sherman | ................. B32B 27/08 349/153 |
| 2011/0100749 A1* | 5/2011 | Nonogi | ................... B32B 27/12 181/291 |

OTHER PUBLICATIONS

Haque et al. ; Electrical Properties of Different Polymeric Materials and their Applications: The Influence of Electric Field, Chapter 3, 2017, pp. 41-63; (Year: 2017).*
Bryan et al., "Two-Layer Plate Mechanical Metamaterials," Technical Digest of Hilton Head 2016: Solid-State Sensors, Actuators and Microsystems Workshop (Hilton Head Island, South Carolina, Jun. 5-9, 2016).
Davami et al., "Ultralight shape-recovering plate mechanical metamaterials," Nature Communications 6:10019 (2015), 7 pages.
Gupta et al., "A high-flow Knudsen pump using a polymer membrane: Performance at and below atmospheric pressures," 2010 IEEE 23rd International Conference on Micro Electro Mechanical Systems (MEMS), pp. 1095-1098 (2010).
Gupta et al., "Thermal transpiration in zeolites: A mechanism for motionless gas pumps," Applied Physics Letters, 93:193511 (2008), 3 pages.

(Continued)

*Primary Examiner* — David Sample
*Assistant Examiner* — Elizabeth Collister
(74) *Attorney, Agent, or Firm* — Baker Botts L.L.P.

(57) ABSTRACT

The presently disclosed subject matter relates to nanocardboard structures and methods of fabrication thereof. An exemplary nanocardboard structure includes at least two parallel planar films and webbing. The planar films can be separated from each other by a gap of from about 0.1 micrometers to about 1000 micrometers.

15 Claims, 42 Drawing Sheets

(56) References Cited

OTHER PUBLICATIONS

Iyer et al., "Large-Area, Freestanding, Single-Layer Graphene-Gold: a Hybrid Plasmonic Nanostructure," ACS Nano 8.6:6353-6362 (2014).
Lee et al., "A Modular 1mm^3 Die-Stacked Sensing Platform with Optical Communication and Multi-Modal Energy Harvesting", Technical Digest of the IEEE International Solid-State Circuits Conference 55:402-404 (2012).
Meza et al., "Strong, lightweight, and recoverable three-dimensional ceramic nanolattices," Science 345:1322-1326 (2014).
Peimyoo et al., "Thermal conductivity determination of suspended mono-and bilayer $WS_2$ by Raman spectroscopy," Nano Research 8(4):1210-1221 (2015).
Pikul et al., "Micromechanical devices with controllable stiffness fabricated from regular 3D porous materials," J. Micromech. Microeng. 24:105006, 9 pages (2014).
Zheng et al., "Ultralight, Ultrastiff Mechanical Metamaterials," Science 344(6190):1373-1377 (2014).
Zhu et al., "Observation of piezoelectricity in free-standing monolayer MoS2," Nature Nanotechnology 10(2):151-155 (2015).

\* cited by examiner

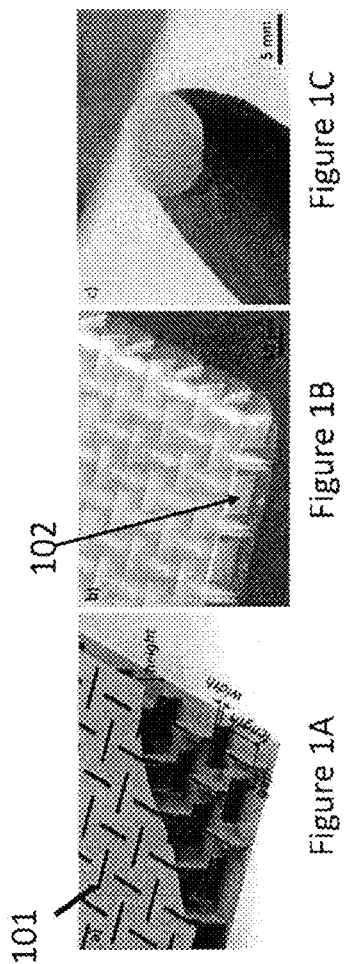

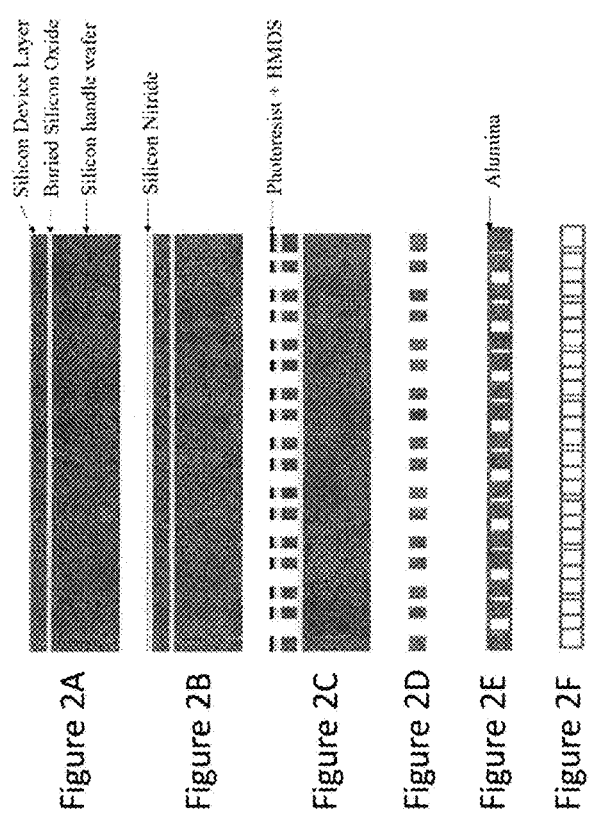

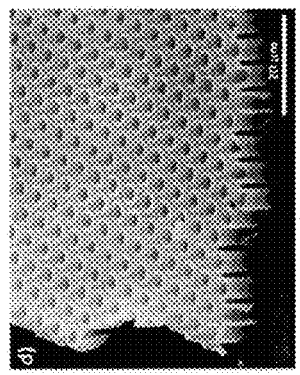
Figure 3B
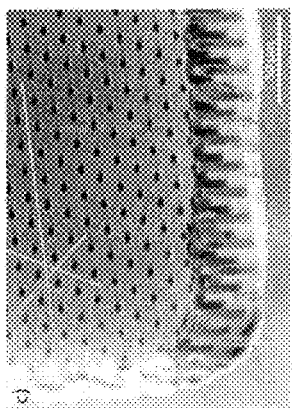
Figure 3D
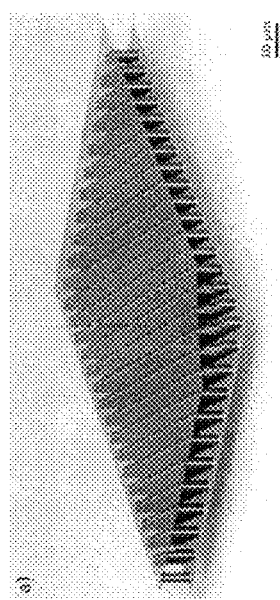
Figure 3A
Figure 3C

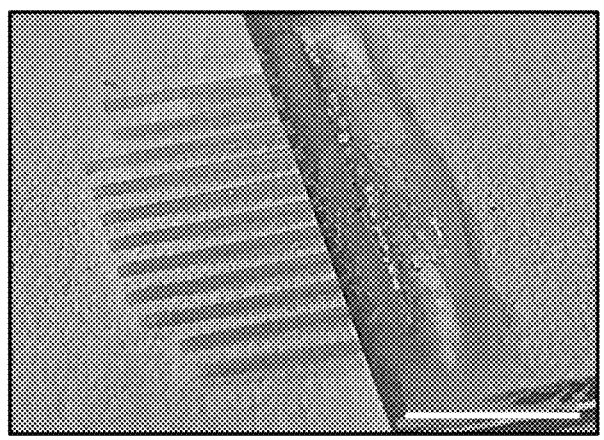
Figure 4A    5mm
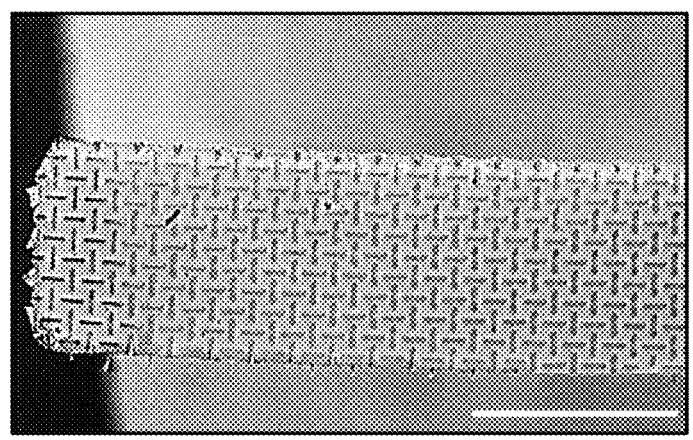
Figure 4B    500μm
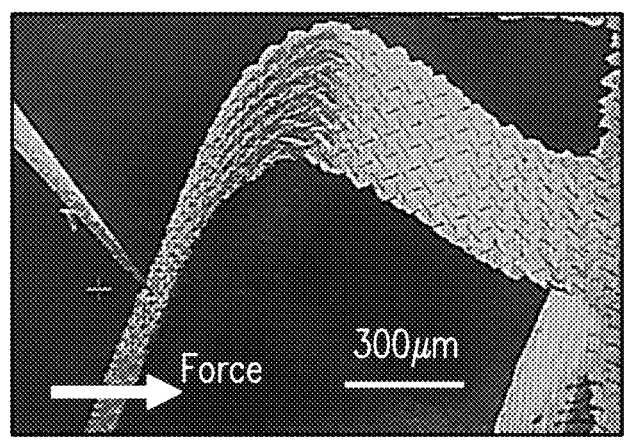
Figure 4C

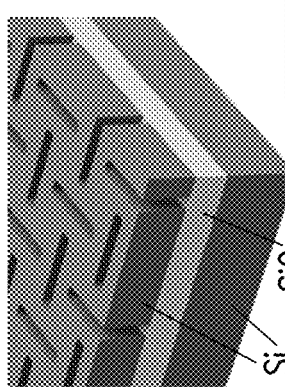
Figure 11D
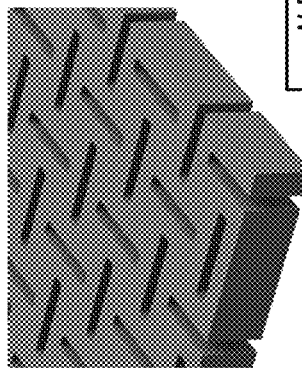
Figure 11E
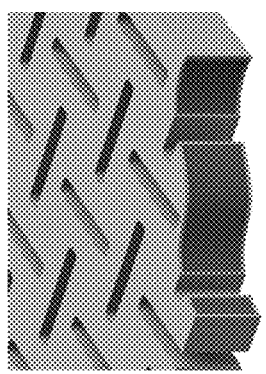
Figure 11F
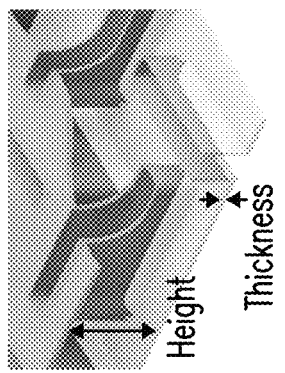
Figure 11G
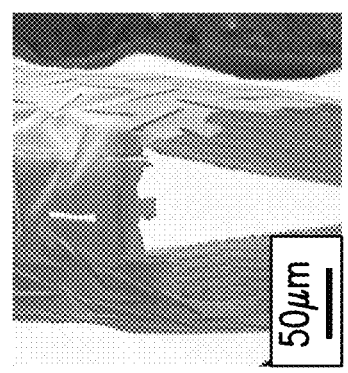
Figure 11K
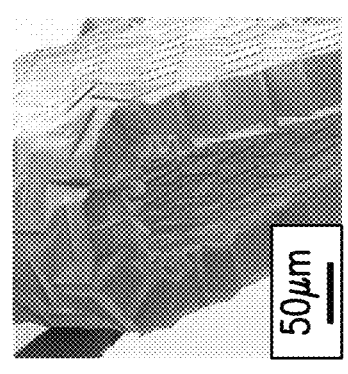
Figure 11J
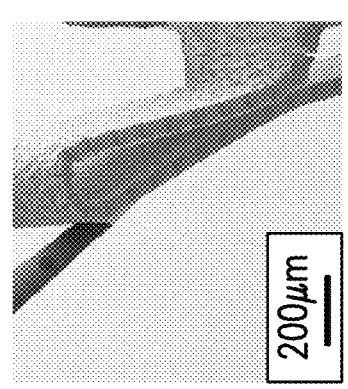
Figure 11I
Figure 11H

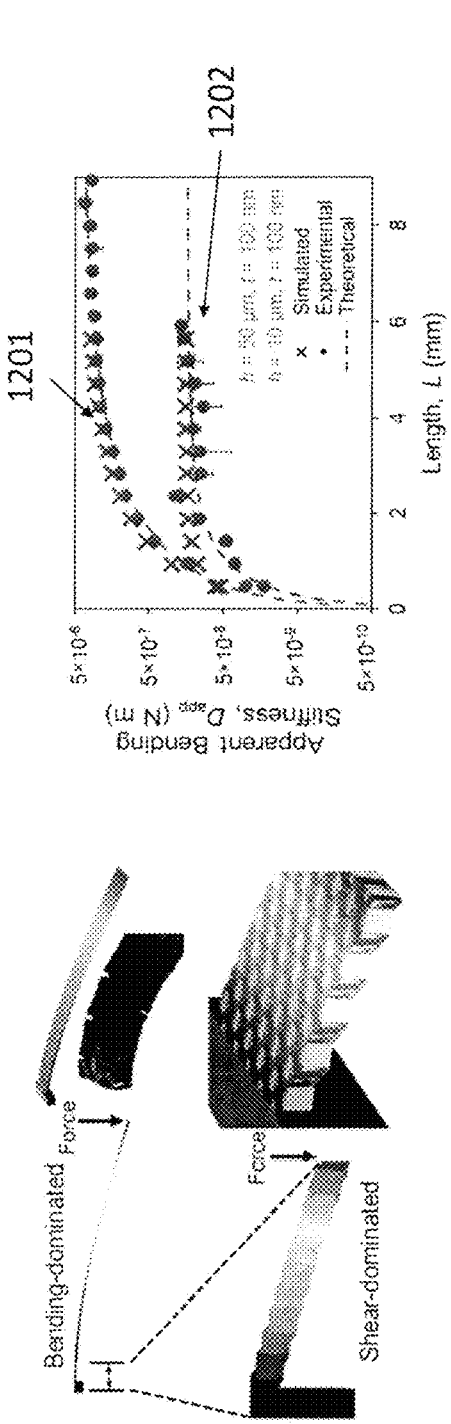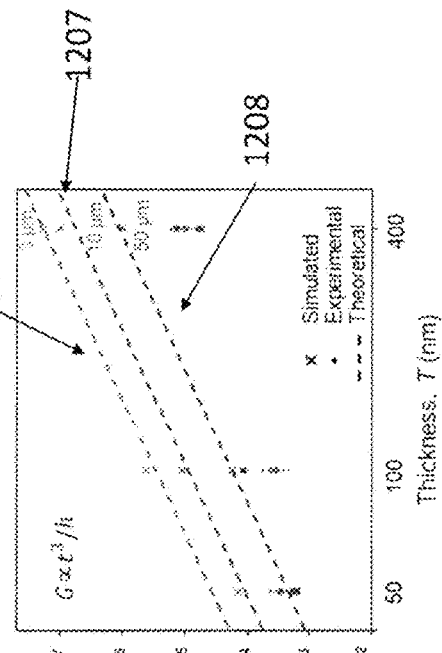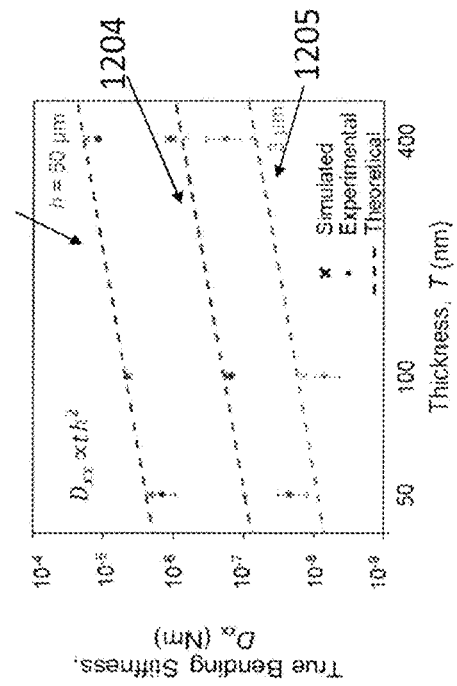
Figure 12A
Figure 12B
Figure 12C
Figure 12D

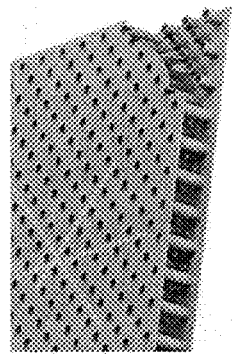
Figure 15C
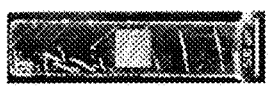
Figure 15B
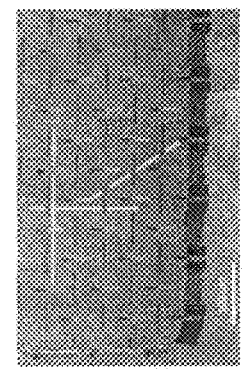
Figure 15E
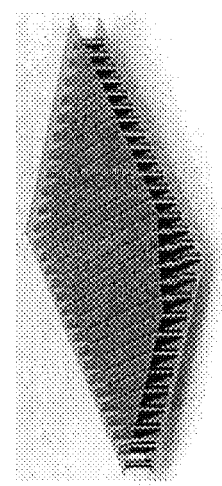
Figure 15A
Figure 15D

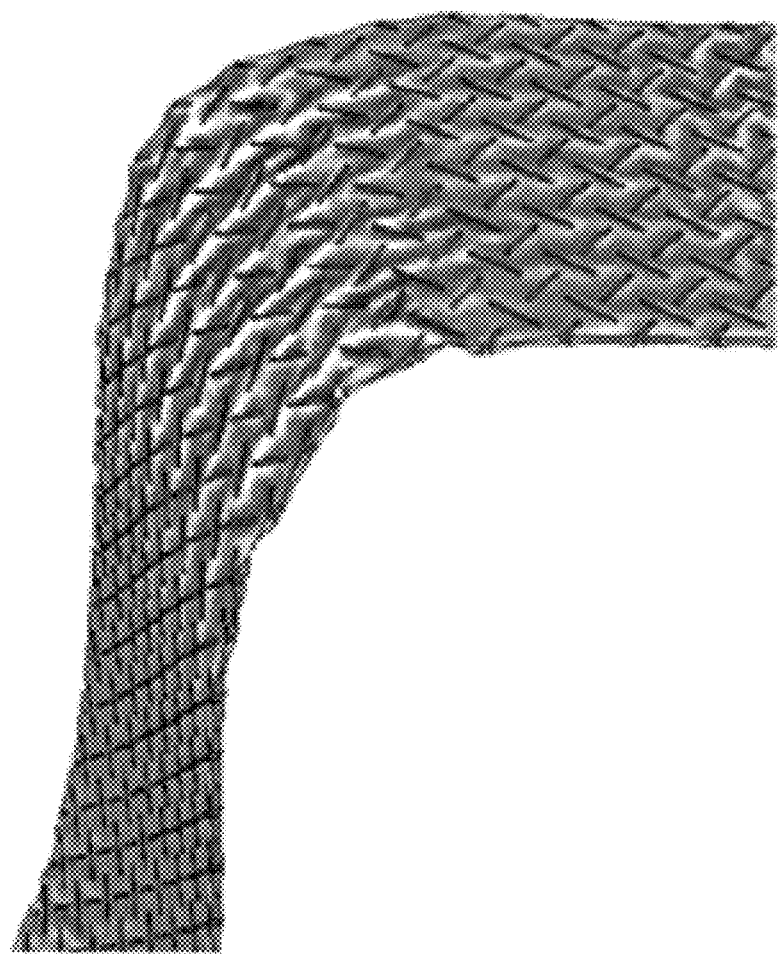
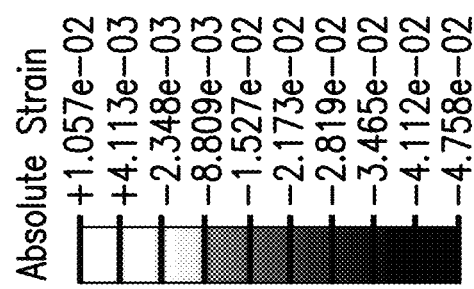
Figure 21G

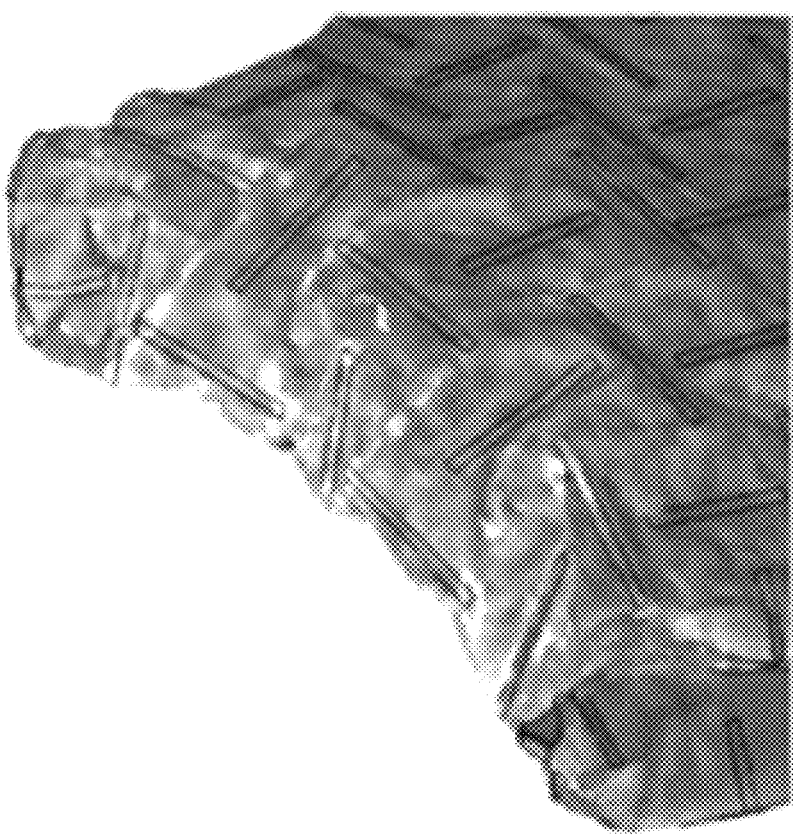
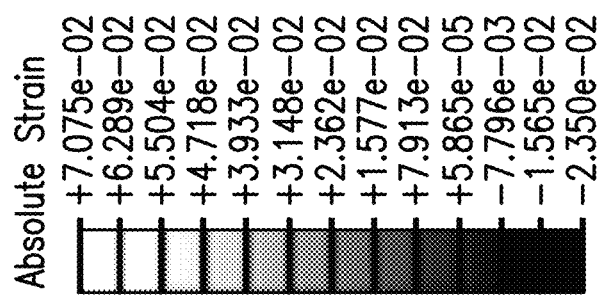
Figure 21I

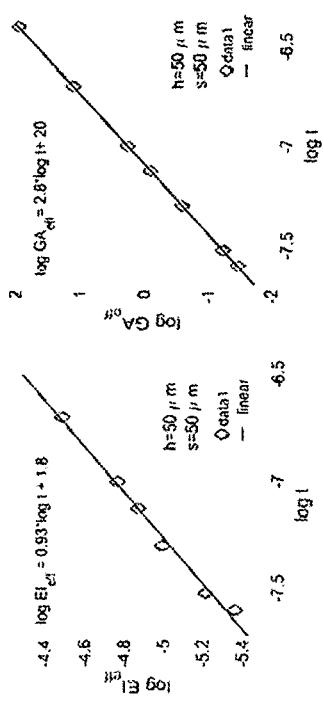
Figure 23A
Figure 23B
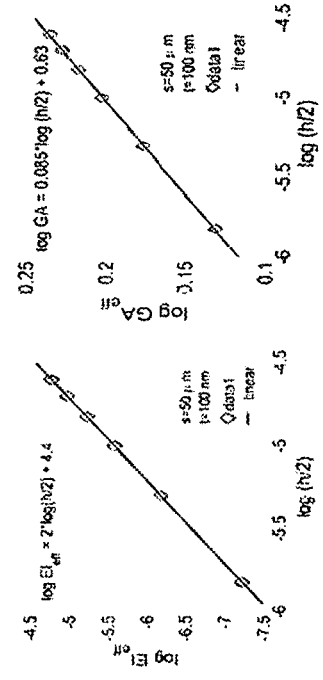
Figure 23C
Figure 23D
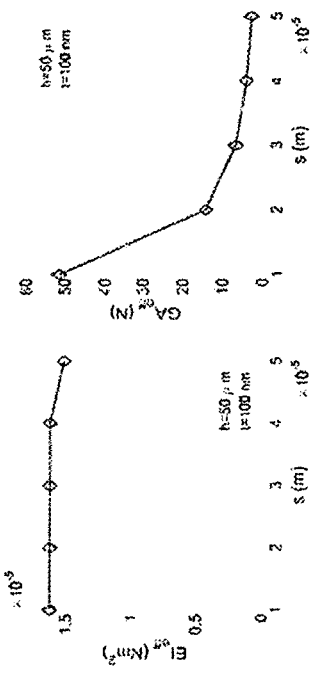
Figure 23E
Figure 23F

ULTRATHIN HOLLOW PLATES AND THEIR APPLICATIONS

CROSS-REFERENCE TO RELATED APPLICATIONS

This application claims priority to U.S. Provisional Application Ser. No. 62/545,754, filed on Aug. 15, 2017, which is incorporated by reference herein in its entirety.

BACKGROUND

Certain cellular solids can be employed in structural applications because they offer a combination of mechanical stiffness and low weight. Certain mechanical metamaterials, a sub-class of cellular solids, have engineered micro/nanoscale periodic geometries, which can lead to both low densities and unique mechanical properties, such as the ability to recover from mechanical deformations. For example, they can have a truss-like or lattice like geometry which can be permeated by the ambient fluid or gas.

Certain mechanical metamaterials can be lightweight, stiff, and geometrically continuous plates, allowing new applications such as microflyer wings. A single-layer or/and two-layer plate mechanical metamaterials can be designed by employing periodic cellular plate design and micro/nano-fabrication technology. These plate mechanical metamaterials can be ultrathin, extremely lightweight, stiff and robust and they can be microfabricated much more quickly compared with certain evaporation-driven self-assembly or nanoscale 3D printing techniques employed when manufacturing lattice-like mechanical metamaterials.

Certain macroscopic composite sandwich structures, including corrugated paper cardboard, have been utilized for commercial shipping, aviation/transportation, acoustics, and building materials. However, they generally can crumple, warp or tear at nanoscale thickness. In certain sandwich plates, face sheets and webbing units are first produced separately, and the face sheets are then glue to either side of the webbing units. Certain honeycomb sandwich plate composites use a core which can be expanded from an easily fabricated shape to cover a much larger area. However, such fabrication techniques are not necessarily practical for at least certain applications at the nanoscale. Furthermore, micron-scale gaps may be required between planar sheets in order to maintain electrical and thermal insulation.

Therefore, there is a need in the art for nanoplate structures including hollow sandwich plate with nanoscale thickness, which can further possess high bending stiffness and maintain electrical and thermal insulation.

SUMMARY

The presently disclosed subject matter provides nanocardboard structure compositions and methods of fabrication thereof.

In certain embodiments, an exemplary composition of a nanocardboard structure includes a parallel planar film, and webbing. The webbing can be placed between two parallel planar films and separate the two planar films.

In certain embodiments, the webbing can form a basketweave motif. The webbing can include a hexagonal array of cylinders. In certain embodiments, the webbing can be configured to be such that any line lying in a plane of one of the at least two parallel planar films can intersect the webbing to prevent wrinkling. In non-limiting embodiments, the webbing can form an alternative basketweave motif.

In certain embodiments, the at least two parallel planar films can include perforations that can match a cross section of the webbing. In some embodiments, the nanocardboard including the perforation can be fabricated through fabrication of a monolithic structure.

In certain embodiments, at least two parallel planar films and the webbing can recover the nanocardboard structure from sharp bending deformation without damage.

In certain embodiments, the nanocardboard structure can be coated on at least one side with a polymer layer. In non-limiting embodiments, the thickness of the polymer layer can range from about 10 nm to 1000 nm.

In certain embodiments, the nanocardboard structure can be electrically insulating. In some embodiments, the nanocardboard structure can be thermally insulating. In certain embodiments, the nanocardboard structure can include aluminum oxide, or alumina.

In certain embodiments, the nanocardboard structure can act as a thermal transpiration membrane. The thermal transpiration membrane can create an overpressure by generating a temperature difference across the membrane. The temperature difference can be generated by a natural source of energy such as sunlight.

In certain embodiments, an exemplary composition for fabricating a nanocardboard structure includes creating a sacrificial silicon mold by etching a silicon-on insulator (SOI) wafer and depositing alumina or alumina oxide to create a planar film and webbing. In some embodiments, the method can further include coating the SOI wafer with a silicon nitride hard mask. In some embodiments, the method can further include creating a pattern on the hard mask using one or more of the following patterning methods: photolithography, electron beam lithography, or nanoimprint lithography.

In certain embodiments, an exemplary composition of an untethered air bearing structure can include a thermal transpiration membrane, a frame to maintain the thermal transpiration membrane, and an energy-absorbing coating on one side of thermal transpiration membrane. In some embodiments, the thermal transpiration membrane can create an overpressure by generating a temperature difference across the membrane. The temperature difference can be generated by a natural source of energy.

In certain embodiments, the thermal transpiration membrane can include a nanocardboard plate, a porous membrane, or a track-etched membrane with pore sizes between about 0.1 micrometers and 10 micrometers.

In certain embodiments, the air bearing structure can levitate a platform at a distance of from about 10 micrometers to about 1000 micrometers between a flat solid surface and the air bearing structure.

BRIEF DESCRIPTION OF THE DRAWINGS

FIGS. 1A-C provide exemplary nanocardboard plates with the basketweave webbing pattern. (A) Computer depiction of the basketweave sandwich structure. (B) A scanning electron micrograph of one embodiment of the hollow nanocardboard sandwich structure fabricated with thin alumina. (C) A circular nanocardboard plate of 13-mm diameter.

FIGS. 2A-F provide schematic images of an exemplary fabrication process for creating nanocardboard plates. (A) Initial silicon-on-oxide (SOI) wafer. (B) Deposition of silicon nitride hard mask. (C) Photolithography patterning of the hard mask and the mold using reactive ion etching. (D) Release of the molds using hydrofluoric acid. (E) Conformal deposition of the nanocardboard material on the mold. (F) Release of the hollow nanocardboard plate using isotropic etching of the sacrificial silicon mold in xenon difluoride gas.

FIGS. 3A-D provide exemplary nanocardboard plates with cylindrical webbing in a hexagonal array. (A) Computer depiction of a plate with a height of 10 µm. (B) Two cantilevers of nanocardboard, with the left showing white, mostly diagonal lines which are wrinkles in the face sheet that appear due to the sparseness of the used cylindrical webbing array shown in panel C, and the right showing no wrinkling due to the basketweave webbing pattern. (C) Scanning electron micrograph of a nanocardboard plate in which the webbing can be a sparse hexagonal array of cylinders. For this geometry, wrinkles can appear along the straight lines (shown in the figure) that run between the sparsely spaced webbing cylinders. (D) Scanning electron micrograph of a nanocardboard plate in which webbing units can be denser and wide straight lines along which wrinkles can appear do not exist because any wide straight lines intersect the cylinders of the webbing.

FIGS. 4A-C provide exemplary images of nanocardboard cantilevers. (A) Cantilevers used for spring constant and bending tests. (B) Scanning electron micrographs of a flat cantilever. (C) A cantilever bent by a stiff probe without permanent damage.

FIGS. 11A-K provide images and schematics showing the nanocardboard plates. (A) Photograph of a large-area nanocardboard sample. (B) Scanning electron micrographs (false-colored) of a flat nanocardboard cantilever and (C) the detail of the basketweave webbing geometry. (D-G) Diagrams of the fabrication process for the nanocardboard structure with a basketweave webbing pattern. (H-K) Scanning electron micrographs (false-colored) of the recoverable sharp bending exhibited by basketweave nanocardboard plates with a thickness of 50 nm and a height of 50 µm (H&I) and 10 µm (J&K).

FIGS. 12A-D provide schematic and plots of the cantilever deflection and characterized properties. (A) Schematic of two different models for cantilever deflection. (B) Plot of experimental and finite-element-simulated $D_{app}$ versus lengths L for two example cantilevers. (C) $D_{xx}$ and (D) G extracted from curve fitting, such as that in (B), along with the theoretically expected scaling trends.

FIGS. 15A-E provide exemplary designs of the disclosed nanocardboard. (A) Nanocardboard with the webbing of hexagonally periodic array of cylinders. (B) Wrinkling of the face sheet (thickness≤100 nm) on a cantilever under optical microscopy. (C) SEM showing straight lines go through the face sheet without intersecting any webbing cylinders. (D) SEM of Experimental observations of wrinkling along the 0°, 60° and 120° directions of the hexagonal lattice. (E) SEM of basketweave pattern on a cantilever where straight lines are necessarily discontinuous due to the rectangular webbing.

FIGS. 21A-I provide SEM and finite-element simulation images of the bending of nanocardboard cantilevers which fully recovered to the initial position after testing. (A and B)

Cantilever with 50 µm height and 50 nm thickness. (C and D) Cantilever with 10 µm height and 50 nm thickness. (E) SEM of another bending test of a cantilever with 50 µm height and 50 nm thickness. (F and G) SEM and FE image of a bending test of a cantilever with 3 µm height and 100 nm thickness. (H and I) FE simulation images showing improved strain for structures with planar, instead of perforated, face sheets.

Figure 22:
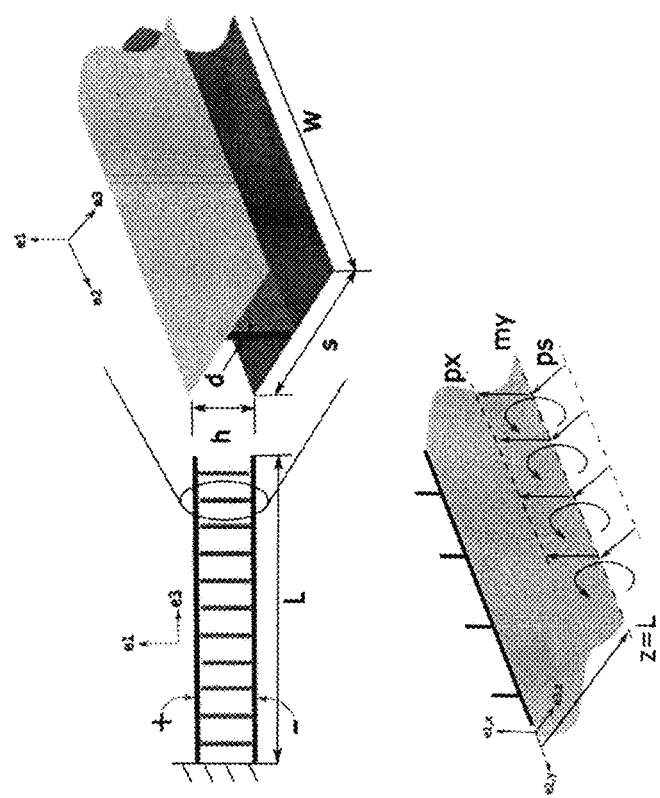

FIG. 22 provides schematics showing geometry of the bi-road (top) and a cantilever plate bent by constant force $p_x e_1 - p_s e_3$ and moment $m_y e_2$ at the edge z=L (bottom).

FIGS. 23A-F provide plots showing variation of bending stiffness $EI_{eff}$ and shear stiffness $GA_{eff}$ with (A and B) t, (C and D) h, and (E and F) s.

Figure 24A:
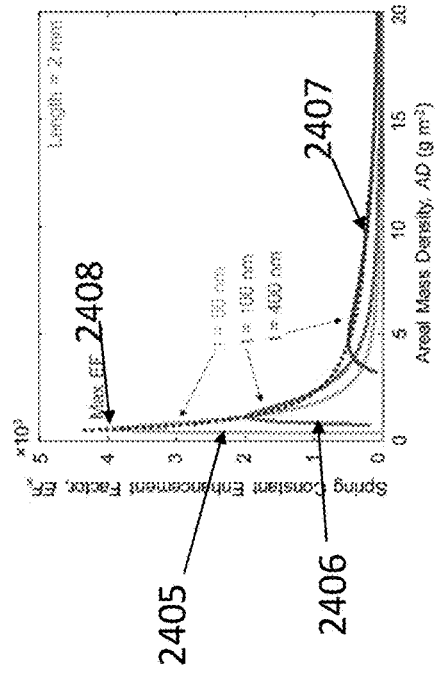
Figure 24B:
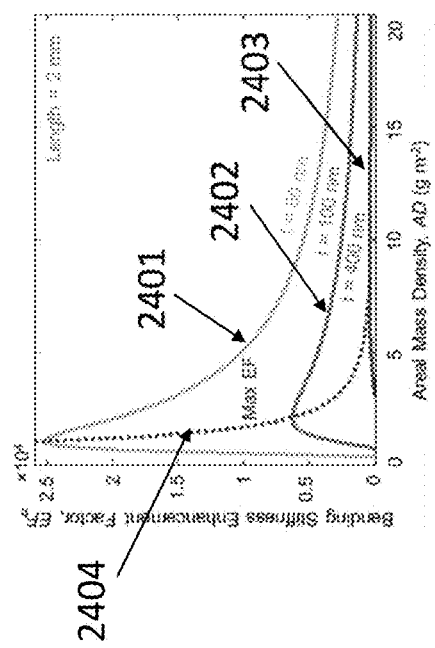
Figure 24C:
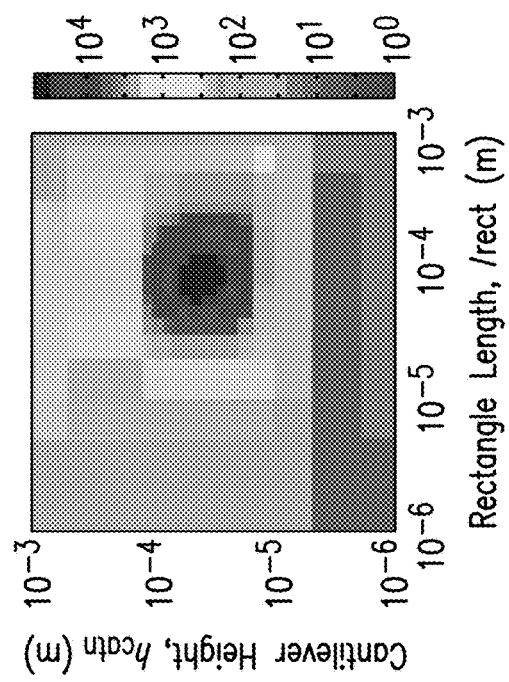

FIGS. 24A-C provide plots of the enhancement factor for different variables. (A) The optimal bending stiffness enhancement factor plotted vs. the areal mass density of a beam for three different thicknesses t. (B) The same plot as (A) though for the optimal spring constant enhancement factor. (C) Density plot of the raw spring constant bending stiffness data from the finite element numerical simulations.

Figure 25:
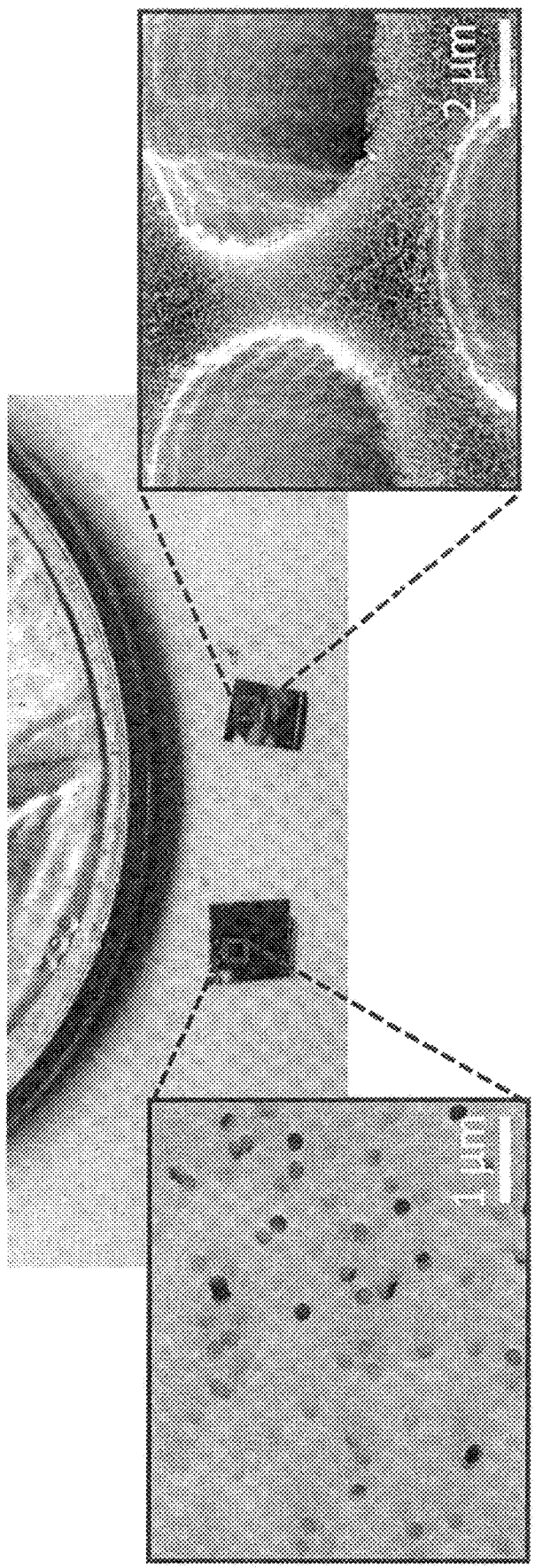

FIG. 25 provides SEM images showing micro and Nano structures of exemplary a polycarbonate membrane and a microfabricated hovercraft.

Figure 26:
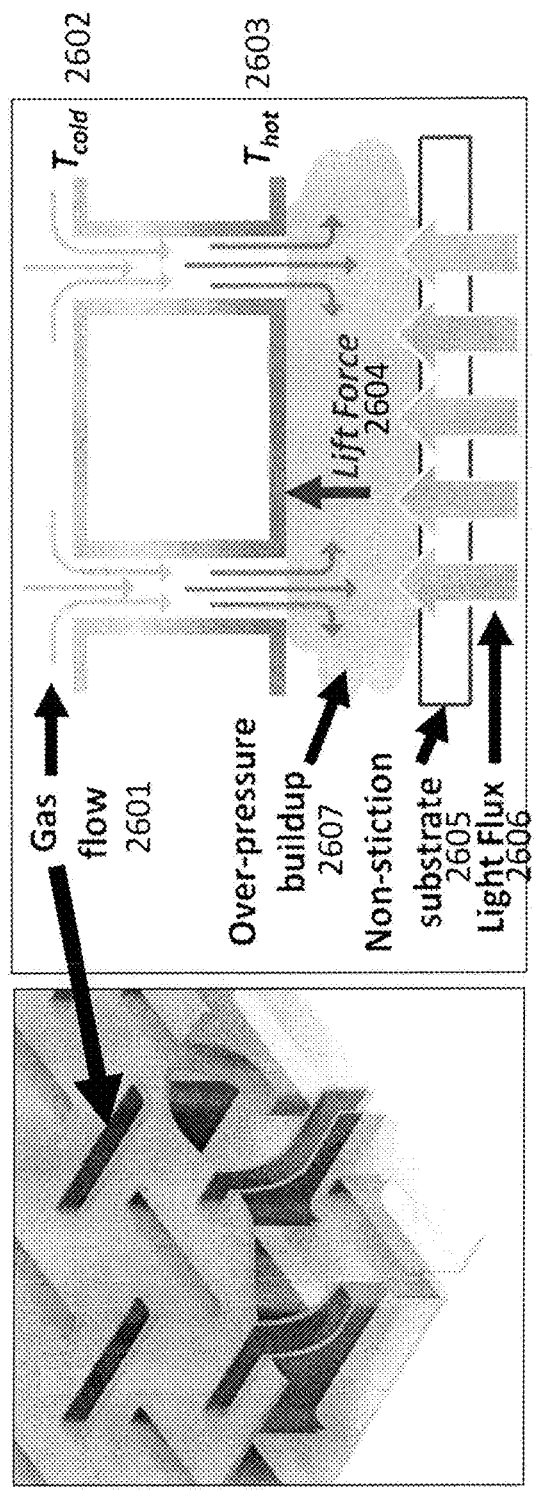

FIG. 26 provides an exemplary CAD model of the microfabricated hovercraft with schematic of thermal creep effects.

Figure 27:
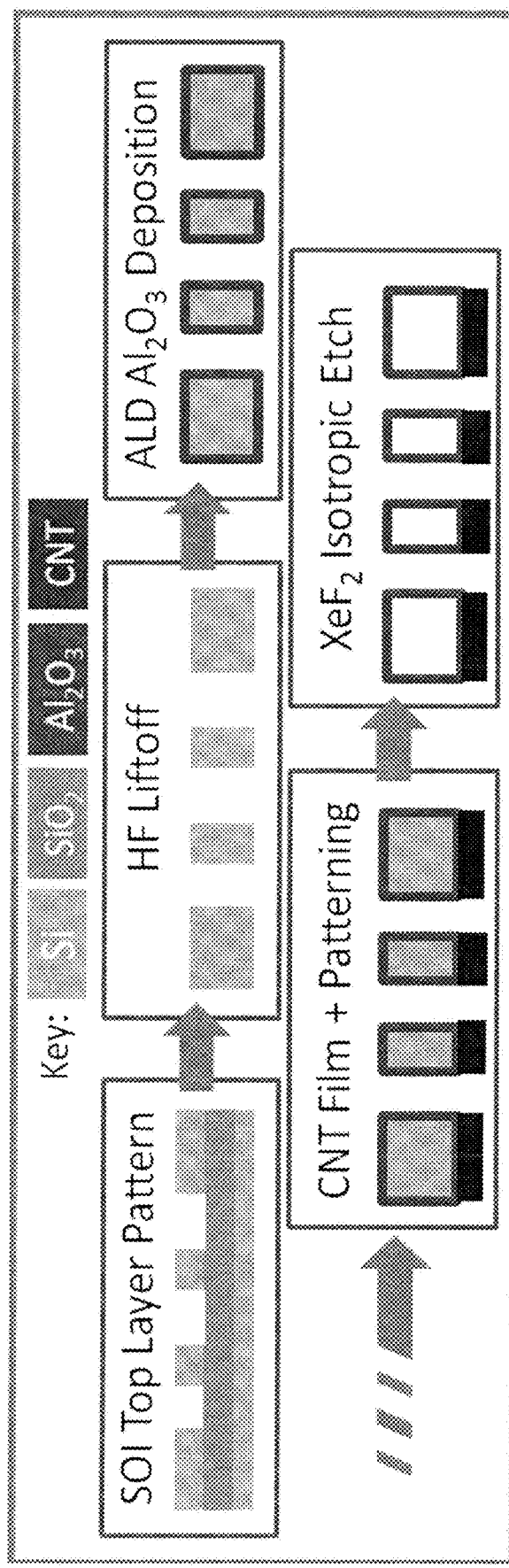

FIG. 27 provides an exemplary fabrication process of microfabricated hovercraft.

Figure 28:
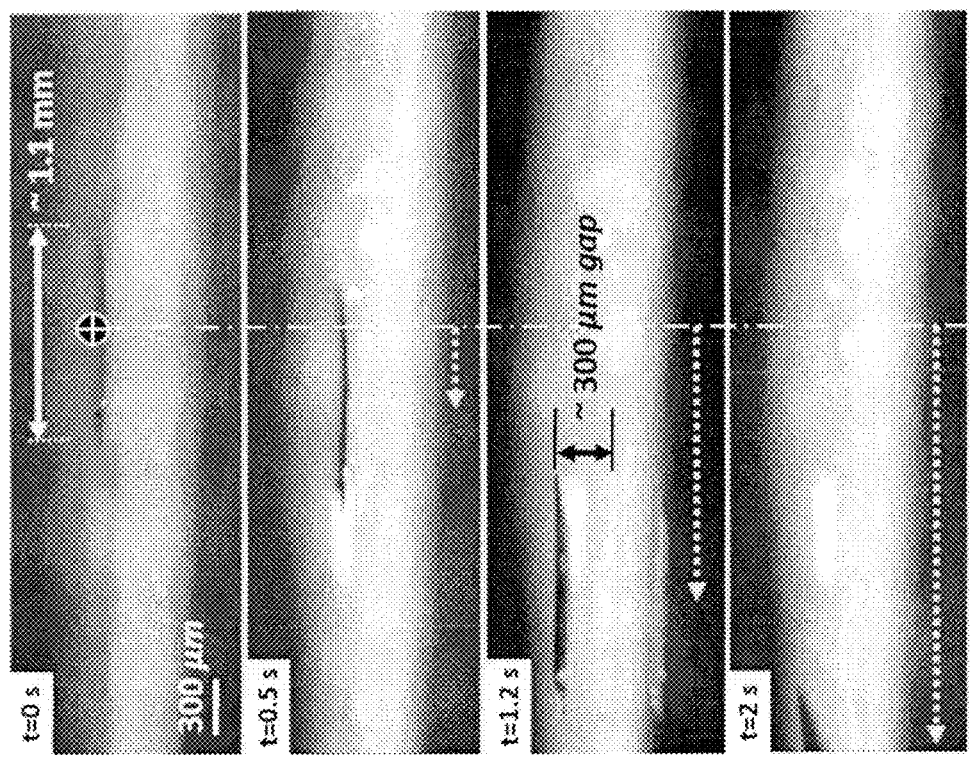

FIG. 28 provides sequential images showing a hovering test flight.

Figure 29:
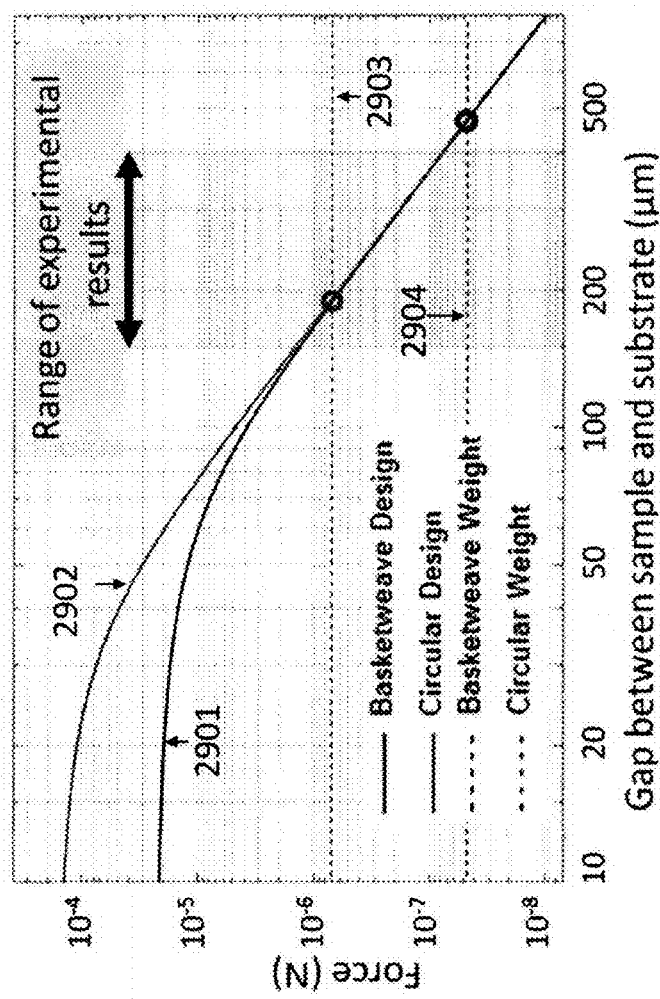

FIG. 29 provides plots showing lift force as a function of gap height for microfabricated hovercrafts.

Figure 30:
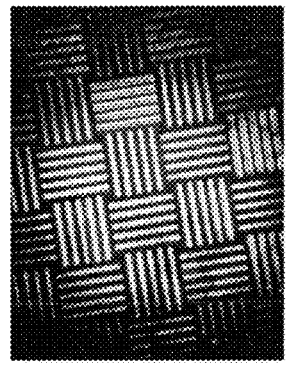

FIG. 30 provides an optical photograph of alternative webbing motif that includes multiple slits in each unit cell and allows a larger flow of air.

Figure 31:
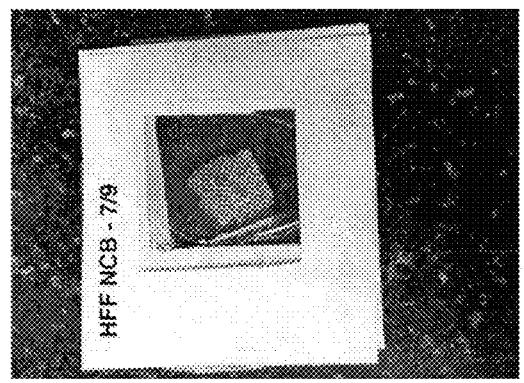

FIG. 31 Nanocardboard structure laminated between two 500-nm-thick polymer layers

DETAILED DESCRIPTION

The presently disclosed subject matter provides a composite structure (i.e., a nanocardboard) which can have enhanced tensile stiffness and light weight. The nanocardboard structure can include two planar face sheets interconnected by an internal periodic webbing. The planar face sheets can be mechanically separated from each other by micron-scale gap via the periodic webbing to create a sandwich structure. For example, as shown in FIGS. 1A and 1B, the two parallel face sheets 101 can be separated by the rectangular webbing elements 102 of a certain height.

In certain embodiments, the face sheet of the present disclosure can have a thickness from about 1 nanometers (nm) to about 1000 nm. For example, and not by way of limitation, the face sheet can have a thickness from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 75 nm, from about 1 nm to about 50 nm, from about 1 nm to about 25 nm, from about 25 nm to about 900 nm, from about 75 nm to about 900 nm, from about 100 nm to about 900 nm, from about 200 nm to about 900 nm, from about 300 nm to about 900 nm, from about 400 nm to about 900 nm, from about 500 nm to about 900 nm, from about 600 nm to about 900 nm, from about 700 nm to about 900 nm or from about 800 nm to about 900 nm. In certain embodiments, the face sheet can have a thickness from about 25 nm to about 400 nm.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about. About with respect to concentration range of the compositions, the current disclosure also refers to any variation of a stated amount or range which an effective amount or range can be.

In some embodiments, the face sheet can include refractory materials such as, but not limited to, aluminum oxide (alumina), or hafnium oxide (hafnia). The refractory materials can be deposited via atomic layer deposition with nanometer thickness. For example, a pair of parallel face sheets can include alumina with a thickness about 25-about 400 nm and can be separated by rectangular webbing which can include alumina with the same thickness.

In some embodiments, the planar face sheet can include a perforation to allow for fabrication of the webbing. For example, the face sheet can have matching rectangular perforations in the same locations as the webbing. If the face sheets can contain perforations that correspond to the shape of the webbing elements, the entire nanocardboard structure can be made in a single conformal deposition, resulting in a monolithic structure of a single thickness. In some embodiments, other fabrication methods can be enlisted in which the planar films are perforation-free.

In some embodiments, the webbing can form a basketweave or a honeycomb pattern. As shown in FIG. 1A, two parallel face sheets 101 can be separated by rectangular webbing 102 elements of a certain height. In the basketweave pattern, the rectangles can have dimensions of length and width, and can be separated by a gap of from about 1 micrometer (µm) to about 1000 µm. The gap can be created by a webbing.

In certain embodiments, the webbing can have a height from about 0.1 µm to about 1000 µm. For example, and not by way of limitation, the webbing can have a height from about 1 µm to about 500 µm, from about 0.1 µm to about 100 µm, from about 1 µm to about 50 µm, from about 1 µm to about 25 µm, from about 1 µm to about 10 µm, from about 10 µm to about 100 µm, from about 25 µm to about 100 µm, or from about 50 µm to about 100 µm. In certain embodiments, the webbing can have a height from about 10 µm to about 50 µm.

In some embodiments, the webbing can form a certain pattern to reduce wrinkles. As shown in left side of FIG. 3b, the planar face sheets of the nanocardboard can be wrinkled at unpredictable locations. These wrinkles spontaneously and unpredictably rearrange themselves, leading to inconsistent mechanical properties. Since wrinkles form along straight lines that do not intersect any vertical webbing feature, as shown in FIG. 3C, the webbing pattern can therefore be designed such that any plane vertical to the plate can intersect a vertical webbing feature to prevent wrinkling. For example, the webbing can form a basketweave pattern. FIG. 1 shows the basketweave pattern as one motif that meets this requirement. The basketweave pattern cannot allow wrinkles along a straight line as long as the gap between the rectangles is no larger than half the difference between the length and the width of the rectangle: gap<

(length−width)/2. In practice, a pattern that nearly satisfies this no-straight-line condition can also prevent the formation of wrinkles.

In some embodiments, the nanocardboard can include a webbing pattern of cylinders in a hexagonal array. FIG. 3D shows a closely spaced hexagonal array of cylinders, which does not show the wrinkles in practice. The hexagonal pattern of circular cylinders cannot allow such straight lines as long as the gap between the neighboring cylinders is no larger than ~0.15 times the diameter of the cylinders: gap<(2/sqrt(3)−1)*diameter. In practice, patterns that nearly satisfy this no-straight-line condition can also prevent the formation of wrinkles. For example, for the hexagonal pattern of cylinders shown in FIG. 3D, narrow lines can be drawn on face sheets without intersecting webbing elements. However, wrinkles still do not form in this structure because the lines are too narrow to allow the full width of the wrinkle, which is typically larger than a few microns. In certain embodiments, other potential webbing patterns can be used for different applications (e.g., one in which anisotropic mechanical characteristics are desirable).

In some embodiments, the webbing can include refractory materials such as, but not limited to, aluminum oxide (alumina) or hafnium oxide (hafnia). The refractory materials can be deposited via atomic layer deposition with nanometer thickness. For example, the face sheets and webbing elements can be made from alumina with a thickness from about 25 to about 400 nm.

In some embodiments, the nanocardboard can have an enhanced bending stiffness, which can allow the nanocardboard to remain flat under mechanical loads. Basketweave-pattern sandwich structures can have higher bending stiffness when the webbing rectangles have a higher aspect ratio (i.e., long and narrow). For this optimized webbing, the bending stiffness can be about one third of that expected from a perfect theoretical sandwich structure, $D_{ideal}=Eth^2/2$, where E is the elastic modulus, h is the height of the sandwich, and t is the thickness of the ALD material. The optimized geometry can be fabricated at heights of h~10 and 50 μm with alumina thickness of t~25, 100 and 400 nm, and cut into cantilevers with lengths L ranging from less than 1 to over 10 mm for mechanical characterization (FIGS. 4a and 4b). In some embodiments, one side of the nanocardboard structure can be clamped on a surface to form a cantilever. In certain embodiments, thin (t of 25 and 100 nm) cantilevers can recover from sharp bending with a ~0.2 mm radius of curvature without visible fracture (FIG. 4c). In some embodiments, as shown in FIG. 1c, the nanocardboard structures can support their own weight as well as additional loads. The nanocardboard can be picked up with tweezers or by hand without visible fracture.

Figure 5:
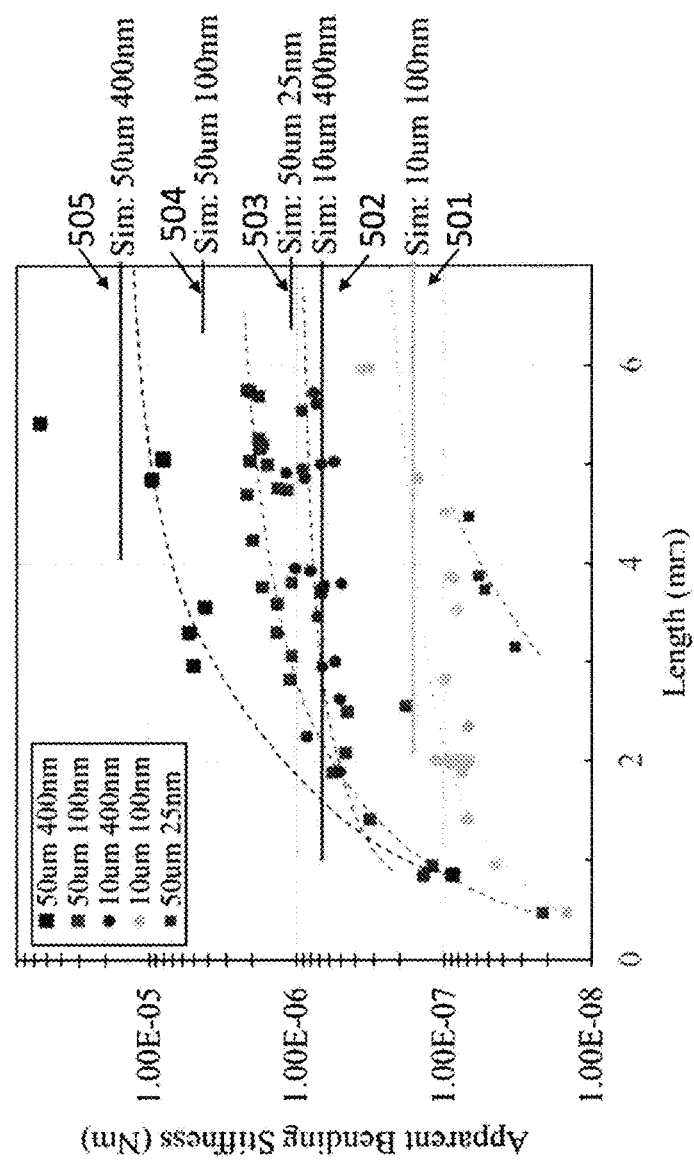
FIG. 5 provides a plot of the calculated bending stiffness $D_{app}=kL^3/(3W)$ vs. cantilever length L. Here, k is the spring constant of the cantilever at the tip and W is the width of the cantilever. The saturated simulated bending stiffness is also shown as solid lines (right). The series are labeled by height (50 or 10 µm) and ALD thickness (25, 100 or 400 nm). Dotted lines are meant to guide the eye of the reader.

In some embodiment, bending stiffness can be verified by COMSOL simulations to determine how the apparent measured bending stiffness changed with geometry. FIG. 5 provides a calculated apparent bending stiffness $D_{app}=kL^3/(3W)$ versus the length of the cantilever. For example, the saturated simulated bending stiffness with various height and ALD thickness is also shown as solid lines (e.g., 10 μm height with 100 nm thickness 501, 10 μm height with 100 nm thickness 501, 10 μm height with 400 nm thickness 502, 50 μm height with 25 nm thickness 503, 50 μm height with 100 nm thickness 504, 50 μm height with 400 nm thickness 505). Dotted lines are meant to guide the eye of the reader.

In longer cantilevers, the displacement of the cantilever tip by a loading force is primarily due to the bending deformation of the whole cantilever and, in these cases, the apparent bending stiffness saturates at the true bending stiffness, $D_{sat} \approx 0.3\ D_{ideal}=0.3\ Eth^2/2$ Accordingly, the bending stiffness can increase for taller and thicker structures, reaching ~$1\times10^{-5}$ nm for h~50 μm and t~400 nm. However, in shorter cantilevers, the tip displacement under load is primarily due to the transverse shear. Therefore, the apparent bending stiffness $D_{app}=kL^3/(3W)$ can be lower than the true (saturated) bending stiffness. In some embodiments, a bending stiffness can be as high as $1\times10^{-5}$ N·m (Newton meter) and a real mass density per unit area can be as low as 0.5 g/m². The nanocardboard structures can withstand sharp bending and elastically recover to the original plate shape. In certain embodiments, the nanocardboard plates can sustain mechanical deformations without fracture and can remain flat at centimeter scale lateral dimensions.

The presently disclosed subject matter further provides methods for fabricating a nanocardboard.

In some embodiments, the nanocardboard structure can be monolithic and formed in a single deposition procedure. Nanocardboard webbing and face sheets can be fabricated around a sacrificial mold in a single deposition procedure.

For example, as shown in FIGS. 2A-F, the mold can be microfabricated from silicon and the deposited material can be alumina. A sacrificial silicon mold can be fabricated from the device layer of a silicon-on-insulator (SOI) wafer via photolithography and deep reactive ion etching. The 10- or 50-μm-thick mold can be released from the wafer by etching away the barried silicon oxide. Next, the mold can be conformally coated with atomic-layer-deposition (ALD) alumina to create the face sheets and the webbing. The mold can be then cut to define the lateral dimensions of the desired plate and expose the trapped silicon of the mold. The mold can be isotropically etched away with $XeF_2$ gas, leaving only the hollow nanocardboard structure. Each wafer can result in many square-centimeter size plates. Etching can be verified by weighing large-area plates on high-precision scales; the measured masses can be on the order of 100 μg and within 10% of the weight expected from the design geometry.

In some embodiments, the nanocardboard can be from extremely thin films: from hundreds of nanometers down to 25 nm, which is only about 100 atoms thick, or even less. The nanocardboard can be lightweight, with typical mass per unit area of less than 1 gram per square meter. For example, the ultralow weight and microscale dimensions of the webbing pores can lend the nanocardboard structure to novel flight and levitation mechanisms based on solid-state thermal air transpiration. By engineering the nanocardboard to enhance this transpiration, an air-bearing platform, activated solely by light and not requiring separate pumps or tubing, can be developed. In some embodiments, the nanocardboard can be used as an application in scanned probes, micro electromechanical systems, microgap thermal insulation, microscale gas pumping, biological membranes, microflyers, and ultra-sensitive scanned probe tips.

Figure 10:
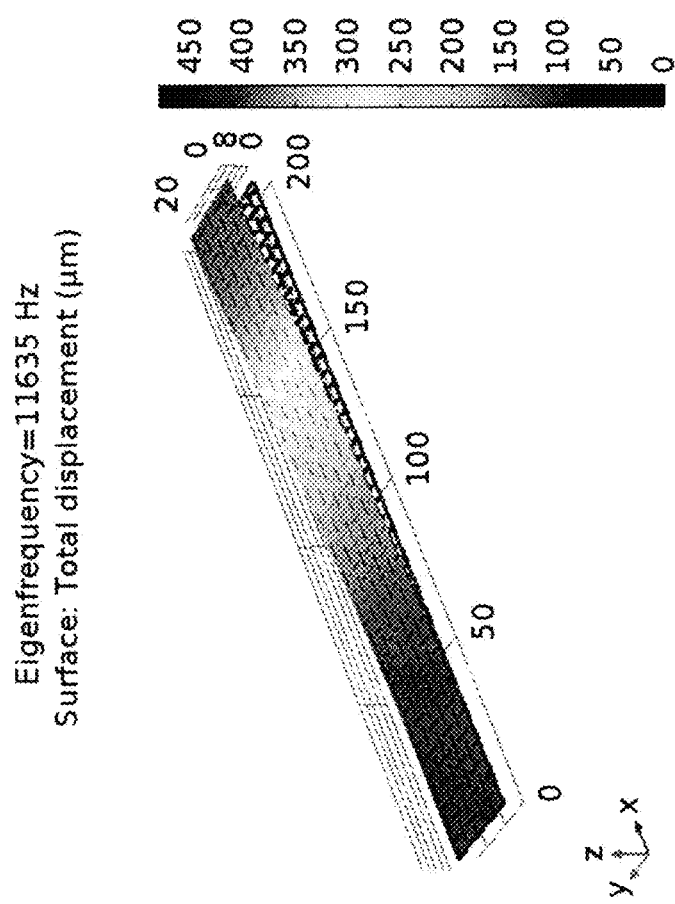
FIG. 10 provides a simulated fundamental resonance frequency and mode shape for a cantilevered nanocardboard plate that has the dimensions of typical scanning probe: cantilever length L=0.2 mm, width W=25 um, nanocardboard height h=0.6 um, alumina film thickness t=25 nm; basketweave rectangle length=5.2 um, basketweave rectangle width w=0.6 um, basketweave gap=1.8 urn.

In some embodiments, the nanocardboard structure can be used for scanning probe microscopy including contact atomic force microscopy, non-contact atomic force microscopy, magnetic force microscopy, Kelvin probe force microscopy and other microscopy techniques that utilize cantilevers. For example, the presently disclosed subject matter provides a low spring constant atomic force microscope (AFM) probe comprising nanocardboard plates. The nanocardboard cantilevers can have resonance frequencies similar to that of a comparably tall solid beam, which can be the structure of typical AFM tips. Both the mass and the spring constant of a nanocardboard cantilever can be 1-3 orders magnitude lower than for such solid beams. As illustrated in FIG. 10, a 25-nm-thick nanocardboard cantilever with typical AFM dimensions (length of 200 μm, width of 25 μm, height of 0.6 μm) can offer the AFM-typical fundamental resonance frequency ~11 kHz and a spring constant of only ~0.0013 N/m, which is about an order of magnitude lower than the spring constants of the softest solid cantilevers that are commercially available. A nanocardboard cantilever of this size can recover from sharp bending, unlike the brittle nature of other currently-available soft cantilevers, making it both more sensitive and mechanically robust. In certain embodiments, the disclosed subject matter can have a sensitivity to image or characterize biomolecule mechanics, unfolding, cell size, morphology changes, molecular orientation, and crystallization.

In some embodiments, the presently disclosed subject matter provides nanocardboard plate wings for flying microrobots. The nanocardboard plate wings can have ultralow weight and mechanical robustness to handle the small loads in microflyer devices, allowing for more design latitude in the rest of the components, e.g., heavier electronics, larger body, less energy consumption. In certain embodiments, any number of the structural components (e.g., hull, supports, frame) of the microflyer can be constructed with nanocardboard.

In some embodiments, the nanocardboard structure can be electrically or/and thermally insulating. The majority of the occupied volume can be air, ambient gas, or vacuum. For example, the air-filled nanocardboard can be used to thermally insulate a particular region. The air-filled nanocardboard can have about 40 times less heat/electrical conducting compared to silicon dioxide or a polymer such as parylene. In certain embodiments, the nanocardboard structure can include alumina which a material that can be well suited for heat applications and electrical insulation.

In some embodiments, the nanocardboard metamaterials can be used as acoustic metamaterials or acoustic membrane. For example, the nanocardboard metamaterials can be utilized for applications such as a high-frequency microphone or a sensing resonator.

In some embodiments, the nanocardboard structure can be biocompatible. The nanocardboard metamaterials can be biocompatible materials such as alumina and can be used as substrates for biological medium or membranes. For example, the biocompatible nanocardboard can physically separate cells, solutions or films by a small distance. Furthermore, the biocompatible nanocardboard can be used as a mesh for mending or bonding of tissue.

In certain embodiments, the exemplary nanocardboard structure can include two planar face sheets which are bonded to a corrugated core forming a sandwich structure. For example, the nanocardboard can include at least two monolithic plates having nanometer-thickness (e.g., 25-400 nm) face sheets connected by micrometer-height tubular webbing. The disclosed nanocardboard can have various sandwich structures such as honeycomb sandwich plates and corrugated cardboard plates. The sandwich plates can offer improved bending stiffness compared to a solid plate of the same mass because the two face sheets can be offset from each other, increasing the effective moment of area, and the shearing of the two face sheets can be restricted by the separating core. The corresponding enhancement in the bending stiffness, relative to a solid plate of the same mass, can be improved with increasing plate height and with decreasing face sheet thickness. Using films with nanoscale thickness can lead to improved enhancement factors and enable large-area structures with nanoscale thickness that do not sag or bend under their weight, feature increased flexural resonance frequencies, or simply minimize the weight of plate-shaped structural components.

In certain embodiments, the disclosed webbing and face sheets can include perforations matching the cross sections of the webbing tubes. This architecture of the nanocardboard can be fabricated by simultaneous deposition of the webbing film and face sheets on a sacrificial mold, creating a monolithic hollow structure made from a single material with nanoscale thickness (e.g., 25-400 nm). In non-limiting embodiments, the nanocardboard plates can be fabricated to have centimeter-square size, which can exhibit an enhanced bending stiffness at mass of ~1 g/m$^2$.

In certain embodiments, the disclosed plate with nanoscale thickness can recover their shape after sharp bending even when the radius of curvature is comparable to the plate height, which is unprecedented for sandwich structures. The geometry of the disclosed nanocardboard plate can enhance the bending stiffness and spring constant by more than four orders of magnitude in comparison to solid plates with the same mass, far exceeding the enhancement factors demonstrated at both the macroscale and nanoscale.

In some embodiments, the disclosed nanocardboard can be used as a structural component for various technologies. For example, the nanocardboard can be used in lightweight robotic microflyers for both the wings and body. In non-limiting embodiments, the disclosed nanocardboard can be for interstellar lightsails which is envisioned to travel at up to 20% of the speed of light in order to reach Proxima Centauri b. The disclosed nanocardboard can provide a mass density below 0.1 g m$^{-2}$ (corresponding to a sail thickness of ~100 nm), the ability to sustain high temperatures, and a sufficient bending stiffness to control the shape. In some embodiments, the disclosed nanocardboard plate can be used for scanning probe cantilevers, micron-gap thermal insulation, resonant chemical sensors, and other microscopic and macroscopic systems.

In certain embodiments, the disclosed subject matter can provide a micro hovercraft. The micro hovercraft can utilize a light, a hear, or a combination thereof-driven Knudsen pumping to create lift. For example, as shown in FIG. 25, polycarbonate hovercrafts and microfabricated hovercrafts can be fabricated. The disclosed hovercraft can include a carbon nanotube-based thin (CNT) film. The CNT film can be located on the underside of the hovercraft. Temperature difference can be created by the CNT film when the hover craft is exposed to the light source. For example, as shown in FIG. 26, gas 2601 can flow through a channel of the hovercraft from a cold 2602 to hot reservoir 2603 due to the temperature difference, and thus lift force 2604 can be created by the thermal creep at atmospheric pressure. In non-limiting embodiments, the hovercraft can hover at heights of about 50 μm to about 400 μm from the substrate 2605 through over-pressure buildup 2607. The hovering can be maintained for as long as the hovercraft remains above the light source 2606, for example, from about a sec to about a minute. FIG. 27 provides an exemplary fabrication process of microfabricated hovercraft.

FIG. 28 provides sequential images of an exemplary hovering of the disclosed hovercraft. The hovercraft can move in any directions (e.g., left, right, forward, backwards, up, and down). As shown in FIG. 29, the hovering distance and/or moving direction can be determined by modifying a geometry and mechanical properties of the hovercraft. For example, FIG. 29 compares hovercrafts with the basketweave design 2901 and circular design 2902. Weights of the hovercraft with basketweave design 2903 and circular design 2904 are also compared in FIG. 29.

In certain embodiments, the disclosed nanocardboard can have an alternative basket weave geometry. For example, FIG. 30 shows the geometry with multiple parallel channels instead of single slit channel in the original basketweave geometry. The alternative basket weave geometry can provide improved gas flow for levitation and therefore increase the lift force and levitation height.

In certain embodiments, the disclosed nanocardboard can be coated on at least one side with a polymer layer. As shown in FIG. 31, the polymer layer can be bonded onto the surface of the nanocardboard structure using heat treatments. The polymer layer can reduce the risk of breakage by arresting crack propagation, thus increasing structural stability. In non-limiting embodiments, the polymer layer can have a thickness ranging from about 10 nm to about 1000 nm, from about 10 nm to about 500 nm, from about 20 nm to about 500 nm, from about 100 nm to about 500 nm, and from about 300 nm to about 500 nm. In some embodiments, the polymer layer can include Mylar polymer.

EXAMPLES

The presently disclosed subject matter will be better understood by reference to the following Examples. These Examples are provided as merely illustrative of the disclosed methods and systems, and should not be considered as a limitation in any way.

Example 1: Thermal-Transpiration-Based Gas Bearings and Hovering Mechanisms

This Example describes one exemplary method of resupplying the gas into an air bearing gap using a thermal transpiration pump which includes a nanocardboard plate.

Both air bearings and hovercraft can rely on the presence of pressurized gas—usually air—between two surfaces. In the case of air bearings, the two surfaces can be formed by mechanically rotating parts (e.g., in high-speed spindles) or sliding parts, such as in reciprocating mechanisms. Certain air bearing can be provided by the air hockey game, where a puck floats above the surface of the air-hockey table and can, therefore, move with very low friction. The creation of a layer of pressurized gas (sometimes called an air cushion) between the two surfaces eliminates mechanical contact between the surfaces, reducing wear and friction compared to the case of solid or liquid lubricants, or other types of bearings. Similarly, in the case of hovercraft, an air cushion can be created below the hovercraft to eliminate direct contact with the ground or water below and reduce the friction experienced by the hovercraft during movement.

In both these cases, the gas in the gap between the two surfaces can be at a higher pressure than the ambient pressure to create a force that pushes the two surfaces apart. Because of this overpressure, the gas can constantly escape from the gap between the two surfaces into the ambient atmosphere. To operate a gas bearing or hovercraft over extended periods of time, the gas can be continuously resupplied into the gap between the two surfaces. In the case of gas bearings, the gas can be supplied by an external gas pump/compressor that is connected to the gas bearing using pipes or hoses. In the case of hovercraft, the gas can be supplied by fans or compressors that are located on the hovercraft itself.

Note that there is no significant difference between the terms "pump" and "compressor." Both devices increase the pressure of the fluid that passes through them. The term "pump" is mostly used for liquids or in cases where the increase in pressure is relatively small. The term "compressor" is mostly used for gasses or in cases where the increase in pressure is significant. Fans are typically used to impart a high velocity to large volumes of gas but can also be used as compressors if the gas they accelerate is fed into an enclosed chamber or a duct.

Compressors or fans that resupply the gas in gas bearings or hovercraft can consume energy resources, typically in the form of electricity or fuel that powers the motor that drives the shaft of a fan or a compressor. In the case of hovercraft, the power consumption can be especially large because of the substantial overpressure necessary to support a large vehicle with its onboard motors and compressors or fans. Scaling hovercraft to smaller dimensions can be problematic because the efficiency of motors, compressors, and fans usually decreases when they are miniaturized. As a result, the operation time of self-powered (untethered) hovercraft can become smaller and smaller as their size is reduced.

An alternative mechanism for pumping/compressing a gas can rely on the complex interaction of gas molecules with solid walls of microchannels in cases where a temperature gradient exists along these microchannels. The temperature gradient can make the molecules move with respect to the walls of the microchannel from the colder areas to the hotter areas even when no pressure difference is present. Such movement of gas molecules is known variously as "thermal slip" or "thermal creep," or in the case of gas molecules moving through narrow channels or porous membranes, as "thermal transpiration." This effect has been long studied and more recently applied to create practical Knudsen pumps/compressors, a.k.a. thermal transpiration pumps or compressors. For optimal pumping effect, the channels can have diameters on the order of micrometer or nanometers. So far, Knudsen pumps are not very well known because they usually are less energy efficient and produce lower pressure increases or lower gas flow rates than the conventional pumps and compressors. However, the lack of moving parts in Knudsen pumps can also make them more durable and reliable.

A method of resupplying the gas to into an air bearing gap is described below. The method uses an integrated Knudsen pump (a.k.a. thermal transpiration pump), composed of a nanocardboard plate, which can provide an overpressure in the gap between two surfaces. A Knudsen pump relies on a temperature difference across a porous layer or microfabricated channel array to create a pressure difference with the help of the thermal transpiration effect. A thermal transpiration membrane that creates an overpressure can be incorporated into a hovering object (e.g., a movable platform), the substrate, or both, depending on the application. In some cases, the temperature difference across the membrane can be created using ambient or natural sources of energy such as sunlight or radiant heat, eliminating the need for both hoses and pipes and onboard fans and compressors. This opens the possibility of creating new hovering objects that can slide easily above another surface without consuming economically valuable energy resources, such as fuel or electricity, and without any hoses tethering the hovering object to the source of pressurized air. Potential applications can include toys, high-precision levelling devices, and other mechanisms that currently utilize air bearings or other gas bearings.

Figures 6A, 6B:
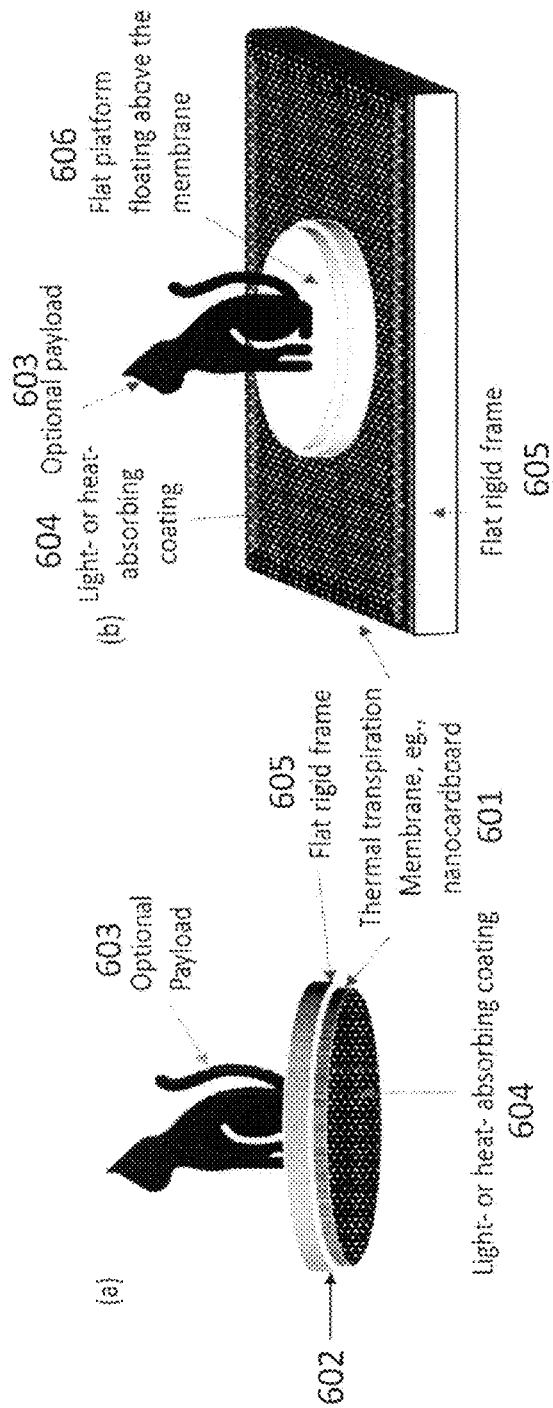
FIGS. 6A-B provide exemplary embodiments of air bearings based on integrated thermal transpiration membranes. (A) An embodiment where the thermal transpiration membrane is incorporated on the bottom of a movable platform with optional payload. (B) An embodiment where the thermal transpiration membrane is incorporated on the top side of a stationary planar substrate.

An example mechanism is shown in FIGS. 6A and 6B. FIG. 6A shows an embodiment where the thermal transpiration membrane 601 is incorporated on the bottom of a movable platform 601 with optional payload (e.g., a toy cat figurine) 603. The resulting platform can then slide with low friction over any other flat surface because of the gas bearing created between the platform and the substrate. In an alternative embodiment shown in FIG. 6B, the thermal transpiration membrane is incorporated on the top side of a stationary planar substrate (e.g., a tabletop). In this embodiment, any flat movable platform 606 can be placed on top of the substrate and can slide with low friction above the substrate similar to the way a puck slides above an air-hockey table. In some embodiments, it can be beneficial to incorporate thermal transpiration 601 into both platform and substrates. In some embodiments, both surfaces can be stationary, or both may be moving. In some embodiments, it can be necessary to attach the thermal transpiration membrane to a rigid flat frame 605 to ensure that the membrane does not deform and remains flat during operation, minimizing the possibility that one part of the membrane snags or is snagged by the opposite surface of the gas bearing.

Thermal transpiration membranes can create an overpressure only if there is a temperature difference between the two sides of the membrane, which usually requires a heat source applied to one side of the membrane (FIG. 6). In some embodiments, the heat can be created using electricity or fuel. In other embodiments, the heat source may be created using ambient energy sources. For example, as shown in FIG. 6, a radiation (energy)-absorbing layer 604 can be deposited on one or both sides of the thermal transpiration membrane. Incident radiation, such as radio waves, radiant heat (i.e., thermal infrared radiation), or visible light incident on the thermal transpiration membrane 604 from one side will then get absorbed preferentially on that side. The absorbed radiation generates local heat on the same side of the membrane, which creates a temperature difference between the two sides of the membrane (FIG. 6). The thermal transpiration mechanism creates an overpressure between the two sliding surfaces.

The thermal transpiration membrane shown in FIG. 6 can be created in a variety of ways. For example, they can be microfabricated or nanofabricated to create a regular array of channels with a precisely controlled geometry. One embodiment is a nanocardboard plate, as shown in FIG. 3D. Alternatively, porous materials like track-etched membranes can be used for this purpose. In all cases, a radiation-absorbing layer can be incorporated on one or both sides of the thermal transpiration membrane. When electromagnetic radiation is incident on the absorbing layer, it generates a temperature difference between about 0.1 K and about 100 K between the two sides of the membrane. In theoretical and experimental studies, these membranes have been shown to create a maximum overpressure that is proportional to the temperature difference between the two sides of the membrane. The proportionality constant can vary between about 0.1 Pascal to about 100 Pascal per degree Kelvin depending on the properties of the porous membrane, such as the diameter of and the spacing between the channels that the gas flows through.

Figure 7:
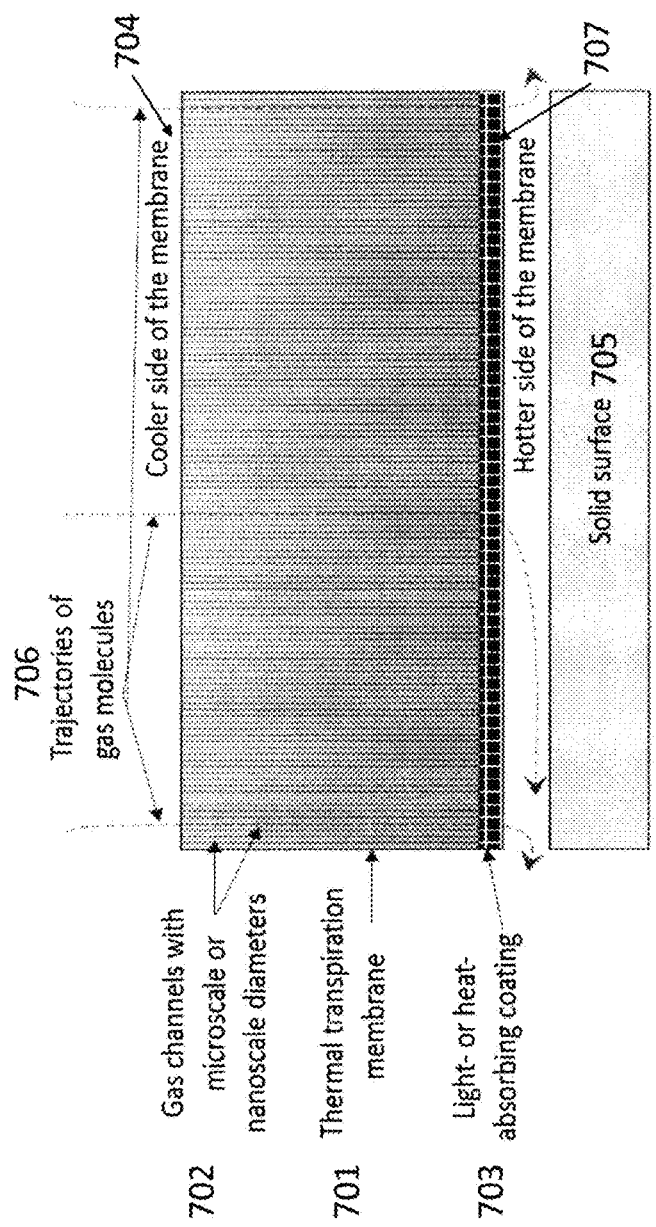
FIG. 7 provides a schematic of the thermal transpiration membrane and the associated movement of gas molecules.

In contrast to conventional gas bearings, where the pump is separate from the gas bearing, in the described embodiment the thermal transpiration membrane 701 is integrated into one or both of the surfaces of the gas bearing. Radiation-absorbing coatings 604 and 702 are also integral parts of the proposed embodiment as shown in FIGS. 6 and 7. The resulting air bearing can, therefore, operate untethered and without any onboard sources of power.

Initially, the platform and the stationary surface can be in direct contact. If external energy is provided in the form of incident radiation that can be absorbed by the radiation-absorbing coatings 702, the electromagnetic radiation can create a cooler side 704 and a hotter side 707 of the membrane, and an overpressure can be created between the two surfaces of the air bearing. The platform with an optional payload can start to rise above the stationary surface. As the gap between the two surfaces of the air bearing increases, the gas 706 can escape more easily from the gap. An equilibrium can be established, in which the overpressure is in balance with the gravitational force experienced by the floating platform. Based on observations and theoretical modeling, the typical equilibrium gap of such air bearing can be between 10 and 200 micrometers. For many smooth surfaces, a gap of this size is sufficient to enable easy sliding of the platform above stationary surface without the asperities of the two surfaces contacting each other and inhibiting the sliding motion.

For example, an untethered transparent platform incorporating a thermal transpiration membrane 701 with gas channels 702 can float and slide with low friction above a solid surface when illuminated with electromagnetic radiation (e.g., light from a lamp or natural sunlight) from above through the transparent platform or from the bottom through a transparent stationary surface. Alternatively, a solid platform 705 can slide above a stationary surface that incorporates a thermal transpiration membrane 701 and a radiation-absorbing coating 703 when illuminated from above or below using, for example, natural or artificial light.

Figure 8:
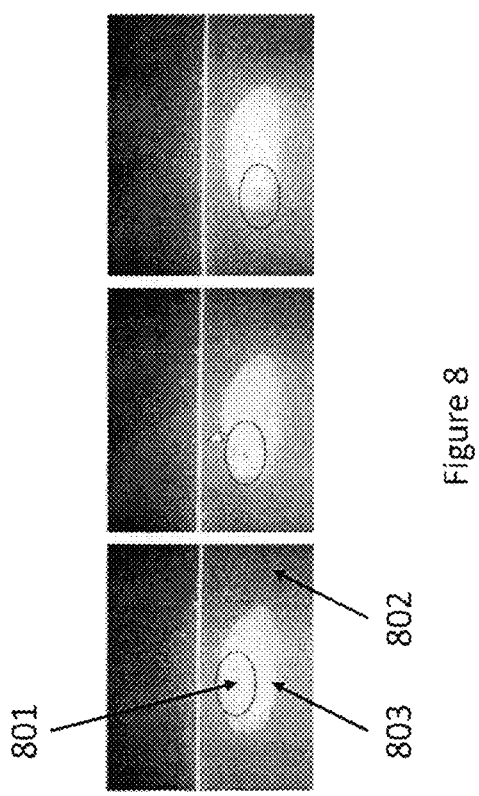
FIG. 8 provides sequential screenshots from a video demonstrating the sliding of a nanocardboard plate above a non-stick surface and glass slide when illuminated from below by an array of light-emitting diodes.

FIG. 8 shows sequential screenshots from a recorded video where a nanocardboard plate 801 with channels was placed on a glass slide 802 and then illuminated from below using an array of light-emitting-diodes 803. Above a certain threshold light intensity, the plate 801 started to float above the plate and slide in one direction because the glass slide was not perfectly horizontal. A track-etched membrane with nanoscale channels can be used instead of a nanocardboard plate to achieve the same air bearing operation.

Apart from making the platform float above a flat surface, a thermal transpiration membrane can be used to propel the moving platform. This can be accomplished by illuminating the absorbing layer with a nonuniform beam of light, which leads to nonuniform pumping across the area of the air bearing. As a result, the platform can become slightly tilted, and the majority of gas can escape on only one side of the moving platform. The asymmetry of the gas escape can result in a reaction force that propels the platform when placed on a completely horizontal surface. When placed on tilted surfaces, the direction of movement can be determined by the gravity-induced sliding "downhill." In some embodiment, the reaction force can exceed the forces that induce the downhill sliding, enabling the platform to move in any desired direction by controlling the distribution of light intensity across the platform/nanocardboard plate.

The thermal transpiration can be strong enough to create a lift force on the membrane, effectively allowing for mid-air levitation. For example, nanocardboard plates can jump high above the platform when irradiated with light from underneath. Furthermore, the nanocardboard can carry significant payloads, as exemplified by a toy cat figurine in FIG. 6.

One potential application is to create devices that float easily above a flat surface when illuminated with sunlight, artificial light from a lamp or flashlight, or invisible radiation from, for example, an infrared light-emitting diode. In contrast to the air hockey game mentioned above, such devices can float above any flat surface rather than only above a specially designed air hockey table, which incorporates an array of holes that supply pressurized air. Thermal transpiration/nanocardboard based air bearings can also be used at the microscopic scale, for example to create freely sliding or rotating structures in MEMS devices, such as gyroscopes and accelerometers.

Figure 9:
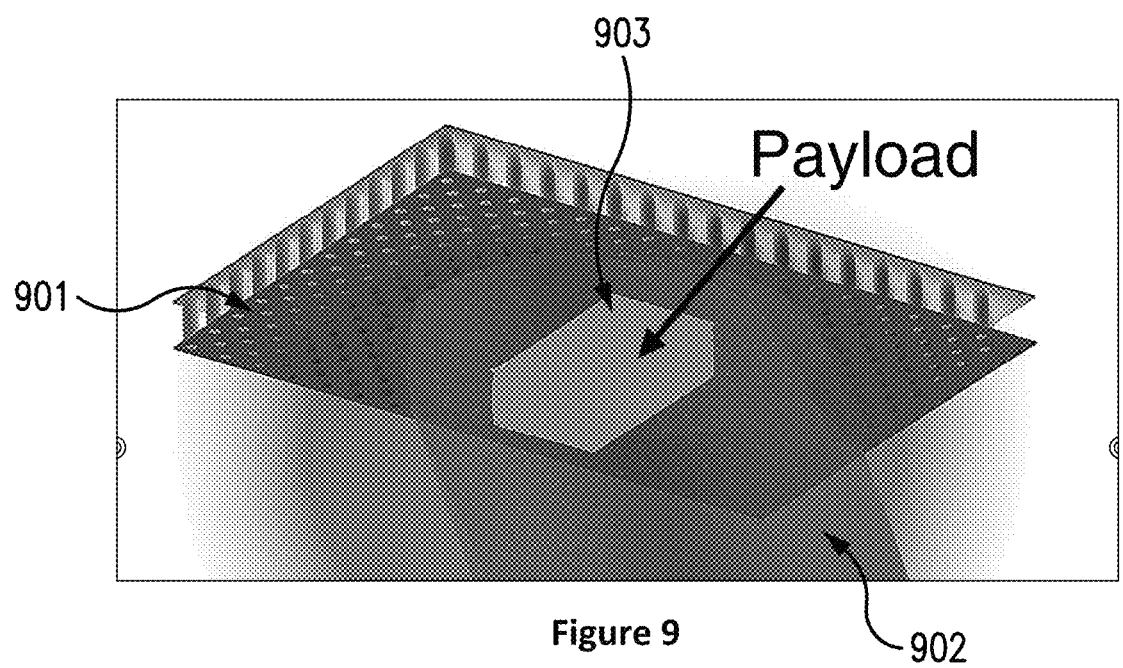
FIG. 9 provides a computer depiction of a nanocardboard microflyer in which the bottom-side is illuminated by a light such as a laser beam to give mid-air lift and levitation.

As a further extension, the mid-air levitation effect can allow for small microflyer plates, as illustrated in FIG. 9. These plates 901 can be controlled with a laser or LED 902 and have a small payload 903. The microflyer plate 901 can carry a force of 100× their own weight at a tube diameter of ~2.5 This force enables microflyers 901 to quickly maneuver around obstacles and carry payloads 903, such as microsensors or communication electronics. For example, a nanocardboard plate 1 cm on the side will be able to carry a payload of up to 10 milligrams, which is enough to carry a CMOS microsystem with 1 cubic-mm dimensions. The nanocardboard plate can carry a battery of the same dimensions or a thin-film photovoltaic cell that covers most of the bottom area of the nanocardboard plate and provides continuous onboard power in the range of tens of milliwatts.

Another potential application is level devices. The purpose of a level is to provide a perfectly horizontal reference plane, which is useful in construction, geodetic surveys, etc. In the commonly used bubble levels, the level is considered horizontal when the bubble settles in the middle of the bubble tube. The accuracy and the response time of the bubble level are determined by the precision of the tube manufacturing, the viscosity of the used liquid, and propensity of the air bubble to pin to defects on the sides of the tube due to the surface tension forces. By using a thermal-transpiration gas bearing, a liquid-free device need only a flat surface (instead of a precision machined tube) to operate. A small movable platform supported by a gas bearing can replace a bubble in a liquid as an indicator. Gas bearings exhibit low friction because gases have a viscosity that is more than one order of magnitude lower than in liquids. Air bearings have no surface tension and, therefore, no defect pinning. As a result, the envisioned level can exhibit faster response times and be more precise due to lower sensitivity to manufacturing defects.

Example 2: Nanocardboard: Hollow Plate Mechanical Metamaterials with Nanoscale Thickness This Example describes an exemplary nanocardboard which comprises monolithic plates including nanometer-thickness (e.g., about 25-about 400 nm) face sheets connected by micrometer-height tubular webbing.

Methods

Silicon Mold Fabrication—

Silicon-on-insulator wafers were coated with a hard mask of $SiO_2$ and $Si_3N_4$ via plasma-enhanced chemical-vapor deposition. The photomask was spin coated (Shipley Microposit S1818 resist) and exposed (Suss MicroTec, MA6 Gen 3, 300-500 mJ/cm$^2$) to provide the webbing pattern and chip outlines (13-mm circles). Wafers were developed in MF-319 (Shipley Microposit) for 1-1.5 min and heated on a hotplate at 115° C. for 1 min. The webbing and outline pattern was transferred into the hard mask through $CHF_3/O_2$ reactive ion etching (RIE) (Oxford 80 Plus). The pattern was then transferred into the silicon via deep reactive ion etching (SPTS) with $SF_6$ and $C_4F_8$.

Silicon Mold Removal from Wafer—

To remove the chips, wafers were immersed upside down in a bath of 49% hydrofluoric acid for >1 hour to etch the oxide. Some of the chips released with careful rinsing with deionized water. The remaining chips were removed by carefully inserting a blade between the chip and the wafer inside a water bath.

Atomic Layer Deposition—

The alumina was deposited using Cambridge Nanotech S200 ALD (250° C. with a pulse of $H_2O$ vapor for 0.015 sec, delay of 5 sec, a pulse of tetramethylaluminum for 0.015 sec, and a delay of 5 sec) on chips that were taped to a custom glass carrier. The final deposited thickness of amorphous alumina was measured with spectral reflectometry (Filmetrics, F40 model).

Laser Machining of Cantilevers and Mounting—

Alumina-coated chips were laser micromachined into individual cantilevers of 2-12 mm length and 0.5 mm width by cutting the outline of each cantilever (IPG IX280-DXF green laser, 50% power, 100 kHz rep rate, 1 to 250 passes for complete etch through). Machined cantilevers were mounted on glass slides with UV-curing epoxy (Loon Outdoors, High Viscosity).

Etching of Silicon Mold—

The silicon mold was etched with $XeF_2$ vapor (Xactics/SPTS), leaving only the hollow nanocardboard structure. The etching (total cycles of 100-200, 60 sec each, 2T vapor) was completed when the nanocardboard became optically translucent, and the dark silicon region had clearly disappeared.

Atomic Force Microscopy Characterization—

In order to characterize the spring constant of cantilevers, an atomic force microscope (AFM) (Asylum MFP-3D) was used at room temperature and commercial AFM probes (calibrated via the Sader method). A force-displacement measurement consisted of the reaction displacement of the AFM probe as it moved through a z-displacement of 10 μm when in contact with the nanocardboard cantilever. Measurement curves were obtained along the length of the cantilever from the base to the tip. A line along the contact portion of the force-displacement curve was fitted to calculate the spring constant and the corresponding apparent bending stiffness $D_{app}$ at each point along the length of the cantilever.

Results

Figure 11A:
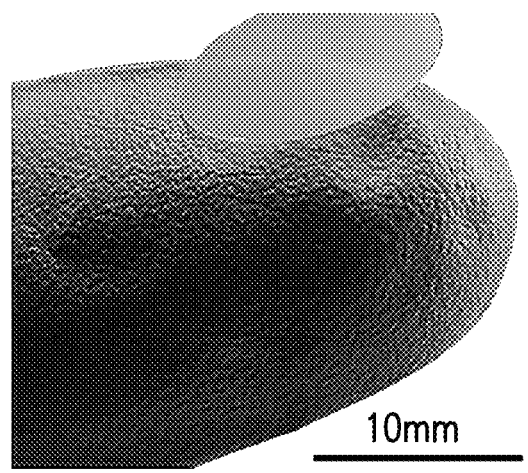
Figure 11B:
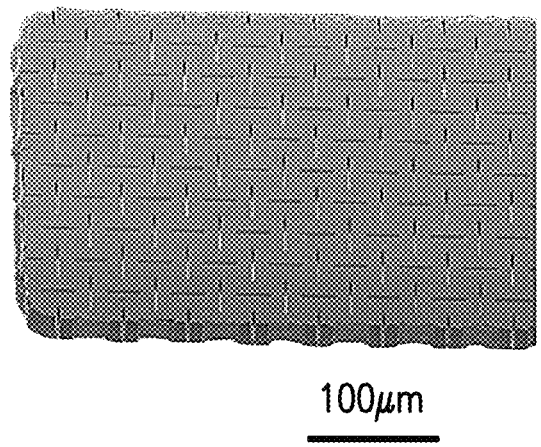
Figure 11C:
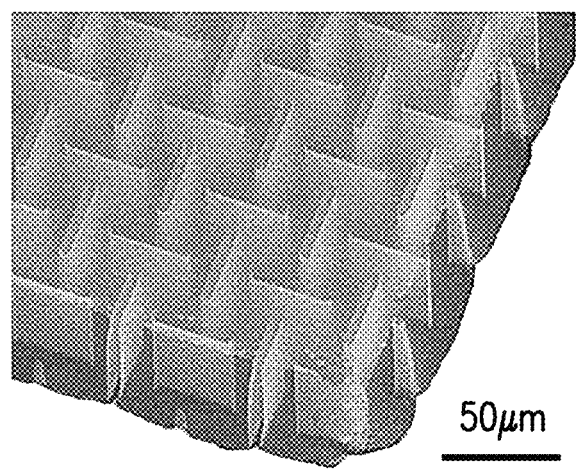

Optimal Design:

The webbing/perforation pattern is important to mechanical characteristics of nanocardboard because the bending stiffness cam be largely determined by the tensile stiffness of the face sheets, which is reduced by any perforations. The geometries and mechanics of perforated planar sheets have been explored, providing certain examples of face sheet geometries that can be adapted into corresponding nanocardboard designs. Numerical optimizations were performed, and the four-fold symmetry basketweave webbing pattern shown in FIG. 11 was chosen for two reasons. First, it provided a combination of a relatively high tensile stiffness and the ability to accommodate large elongations, which for nanocardboard, translates into an improved bending stiffness and the ability to recover from extreme bending deformations. Second, it prevented the spontaneous wrinkling of the face sheets as long as the webbing pattern satisfied the no-straight-line condition, that is, any potential straight-line wrinkle/crease must intersect a webbing feature.

Fabrication:

The plates were microfabricated using the process described in detail in the Methods Section. Briefly, photolithography and etching were used to etch tubular holes in a thin silicon mold, which was then conformally coated with alumina using atomic layer deposition (ALD). The alumina shell was released by dry etching the silicon out from the interior. Measurements on alumina plates up 1 cm in size showed that they were sufficient for the characterization of bending and shear stiffness, nanocardboard plates can be made of any other conformally deposited material, and production could potentially be scaled to 6-inch wafer substrates producing square meters of nanocardboard on the timescale of a day. The mold also can be fabricated using other techniques such as two-photon stereolithography, although the maximum lateral sizes could be limited for these serial fabrication techniques.

Figure 19:
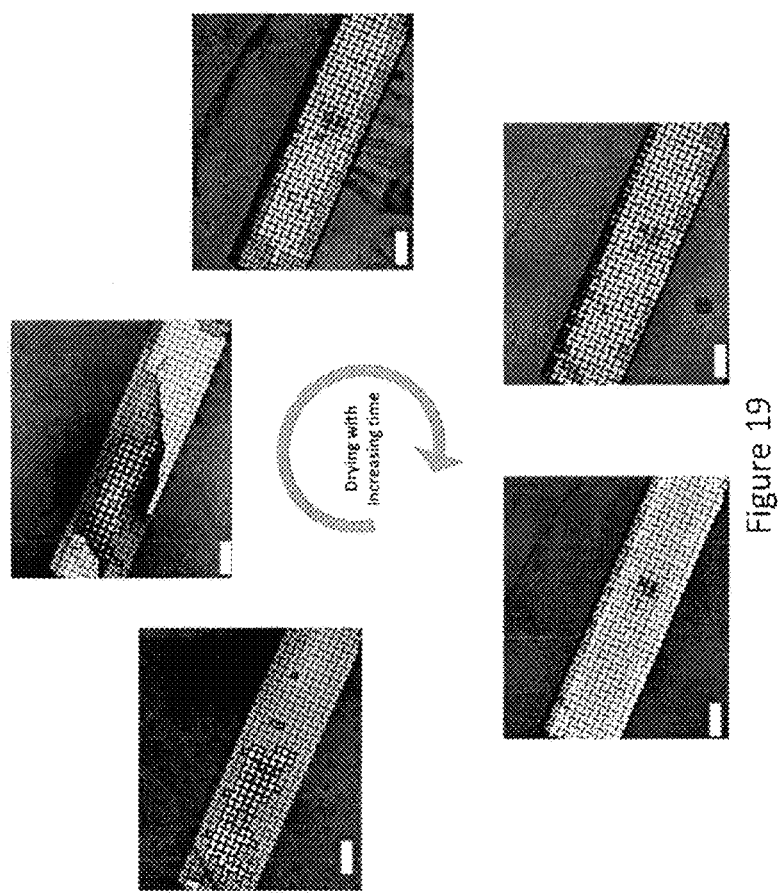
FIG. 19 provides series of 5 optical microscope snapshots while acetone was drying from between the face sheet spacing of a nanocardboard cantilever.

The resulting nanocardboard samples could be handled by hand or tweezers as they are surprisingly robust with respect to bending and out-of-plane compression. Also, when immersed in water or acetone, the plates survived without showing any deflection or failure from the surface tensions of the drying meniscus (FIG. 19), in contrast to failure that has been observed in other thin-walled mechanical metamaterials.

Recovery from Extreme Bending Deformations:

The thinnest nanocardboard plates could sustain very sharp bending without catastrophic damage, as illustrated in FIG. 11H-K. This behavior of recoverable deformation with a brittle material has been observed for a few other architected micro/nanostructures, but only under compressive loads. Sharp-bending recovery does not have a precedent in macroscopic sandwich plates or microscopic sandwich plates with continuous face sheets, which typically fail via the yield, fracture, or delamination of the face sheets, or irreversible buckling of the webbing. For metal, paper, and polymer composite sandwich plates, the failure typically occurs when the radius of curvature is about two orders of magnitude larger than the height of the plate structure, and once a macroscopic sandwich plate forms a crease, it is irreversibly weakened and typically cannot recover the original flat shape and bending stiffness. In contrast, the disclosed nanocardboard plates sustained a radius of curvature down to just a few times the characteristic element size of the nanocardboard—the height of the plate or the period of the webbing, whichever is larger—and recovered without visible damage after such deformations. The nanocardboard plates can elastically recover without fracture or irreversibly buckling because the local strains did not exceed ~1%, which is below the typical yield strain of ultrathin ALD films. In contrast, our simulations of hypothetical nanocardboard sandwich plates with continuous, unperforated face sheets showed >4% strain under similar bending deformation (FIGS. 21H and 21I) while a solid uniform plate would experience even larger strains of >10%. In these more traditional geometries, the bending-induced strains would fracture not only alumina but most other non-elastomer materials. Therefore, the perforated nature of the disclosed nanocardboard is crucial for not only the monolithic fabrication process but also the observed shape recovery.

Definition of Bending Stiffness of Microscale Sandwich Plates:

Bending stiffness, also known as flexural modulus, is one of the most important characteristics of architected plates since the plates are typically used to support out-of-plane loads. To determine the optimal geometry of the webbing, finite element simulations was performed using COMSOL and ABAQUS software packages. The results indicated that the bending stiffness, D, of basketweave nanocardboard was maximized when the length of the webbing rectangles was much larger than their width and the webbing rectangles were spaced as far as the no-straight-line rule allows. Both simulations and experiments showed that such a high-aspect-ratio basketweave pattern has $D \approx 0.3\, D_{ideal}$, where $$D_{ideal} = \frac{1}{2} Eth^2/(1-v^2) \quad (1)$$

$D_{ideal}$ is the bending stiffness of an ideal theoretical sandwich plate with continuous face sheets, E and v are the Young's modulus and Poisson ratio of alumina, h is the plate height, and t is the face sheet thickness. These results are consistent with previous simulations of the tensile properties of sheets with basketweave perforations, in which the tensile stiffness was approximately 30% of that of a sheet without perforations. Despite the orthogonal nature of the basketweave pattern, the bending stiffness of the plates was approximately isotropic, deviating by no more than 10-15% from the maximum value for different bending directions (FIG. 20).

Measurement of Bending and Shear Stiffness:

To characterize the mechanical properties of the nanocardboard structure, the response of cantilevers to out-of-plane loads was measured using an atomic force microscope (AFM). In general, for an out-of-plane end load F on a cantilever with length L and width W, the total deflection is caused by both the shearing and the bending deformations:

$$\delta_{total} = \frac{FL}{GhW} + \frac{FL^3}{3DW}, \quad (2)$$

where G is the transverse shear modulus and D is the bending stiffness of the cantilever material. For a solid cantilever that is much longer than it is thick (L>>t), the bending-induced displacement typically dominates, and the shear-induced deflection can be neglected. Previously reported microfabricated cantilevers were typically solid and long, and thus well described by the Euler-Bernoulli theory, with their spring constant depending on only the bending stiffness:

$$k_{cant} = 3DW/L^3 \quad (3)$$

For solid cantilevers, the bending stiffness is given by $$D_{solid} = \frac{Et_{solid}^3}{12(1-v^2)}, \quad (4)$$

where $t_{solid}$ is the thickness of the solid cantilever, E is the elastic (Young's) modulus of the cantilever material, and v is its Poisson's ratio. Combining the two expressions results in the familiar formula for the spring constant of a high-aspect-ratio solid cantilever:

$$k_{solid} = \frac{EWt_{solid}^3}{4L^3(1-v^2)} \quad (5)$$

However, hollow cellular plates can have a very low shear modulus and can, therefore, exhibit shear-dominated deflection even in moderately long cantilevers. As a result, naively using the standard Euler-Bernoulli relationship:

$$D = k_{cant}L^3/3W \quad (6)$$

gives the true bending stiffness of a cantilever plate only for extremely long cantilevers, but, for less long cantilevers, it instead gives the apparent bending stiffness. Using the more accurate Timoshenko beam theory, the apparent bending stiffness can be found as $$D_{app} = L^2 / \left( \frac{L^2}{D_{xx}} + \frac{3}{Gh} \right), \quad (7)$$

where $D_{xx}$ (N m) is the true bending stiffness of the sandwich plate and G (N m$^{-2}$) is its transverse shear modulus. In short cantilevers (FIG. 12A bottom), shear dominates the deflection and the apparent bending stiffness increases with the cantilever length as $$D_{app} = GhL^2/3 \quad (8)$$

However, above a certain critical length, $$L_c \sim \sqrt{\frac{3D_{xx}}{Gh}} \quad (9)$$

the total deflection is dominated by bending deformation and $D_{app}$ saturates at the true bending stiffness, $$D_{xx} \sim 0.3 \times D_{ideal} = 0.3Eth^2/2D_{xx} \text{(FIG. 12A top)} \quad (10)$$

To determine the bending and shear stiffness experimentally, nanocardboard cantilevers of constant width, W≈500 μm, and lengths L ranging from <0.5 to >10 mm were fabricated. The load vs. displacement curves were measured with an AFM, providing $k_{cant}$ and thus the experimental value of $D_{app}$. FIG. 12B shows examples of the apparent bending stiffness $D_{app}$ for different points along the length of two cantilevers, illustrating the transition from shear-dominated to bending-dominated deformation. Bending stiffness of the cantilever 1201 with h=50 μM and t=100 demonstrated good agreement between the experimental and simulated data points, obtained from full-size COMSOL finite-element models. Bending stiffness of the cantilever 1202 with h=10 μm and t=100 also demonstrated good agreement between the experimental and simulated data points. The experimental data from the cantilevers were then fit to the Timoshenko-theory formula:

$$D_{app} = \left( \frac{1}{D_{xx}} + \frac{3}{L^2 Gh} \right)^{-1} \quad (11)$$

resulting in the bending and shear stiffness shown in FIGS. 12C and 12D. The experimental and simulation-based data generally matched each other within the margin of error. True bending stiffnesses of the h=50 μm data 1203, h=10 μm data 1204, and h=3 μm data 1205 are shown in FIG. 12C. Shear modulus of the h=3 μm data 1206, h=10 μm data 1207, and h=50 μm data 1208 are shown in FIG. 12D. The error bars observed for some of the h=3 μm and t=50 nm data 1205 can be explained by the experimental noise present and the low number of shear-dominated data points in the testing of the longer L>3 mm cantilevers with relatively low spring constants. In addition, the experimental values for the shear stiffness deviated from the simulated values for the largest thickness of t=400 nm. This discrepancy is likely due to the effect of imperfectly rigid cantilever clamping since the discrepancy only appeared for the measurements of the shortest and thickest samples.

Analytical Model of Nanocardboard

In addition to the finite-element simulations, a simplified bi-rod-derived model was developed, which provides an analytical insight into how the true bending stiffness and the shear modulus are expected to scale with the geometric parameters of the webbing. The model included two face sheets connected by cylindrical webbing, all of which are capable of elastic extension, shearing, and bending. The governing equations obtained via the balance of forces and moments accurately describe the mechanics of the outer plates and the web under the assumptions that the loading and boundary conditions are homogeneous along one direction. A novel feature of the model for the granularity, or discontinuous nature, is the webbing pattern, which is crucial for getting the correct scaling laws. As can be seen in the bottom of FIG. 12A, the face sheets of nanocardboard do not deform as a smooth arc but rather in the stair-case fashion, and our analytical model accounted for this granularity by considering the webbing spacing/period, s.

The bi-rod-based analytical model gives accurate predictions for the trend/scaling of the bending stiffness and shear transverse modulus with the geometric parameters of the webbing, although the quantitative predictions are less accurate since the two-dimensional analytical model cannot capture the full complexity of the three-dimensional basketweave webbing. According to the model, $D_{xx}$ is predicted to scale as th$^2$ and G as t$^3$/(s$^2$ h). The critical length $L_{crit}$ is predicted to scale as:

$$L_{crit} \propto \sqrt{D/Gh} = sh/t. \quad (12)$$

As shown in FIGS. 12C and 12D, the experimental and numerical data points generally match the scaling predicted by the bi-rod-derived model except for the experimental discrepancies as discussed above.

Figure 13A:
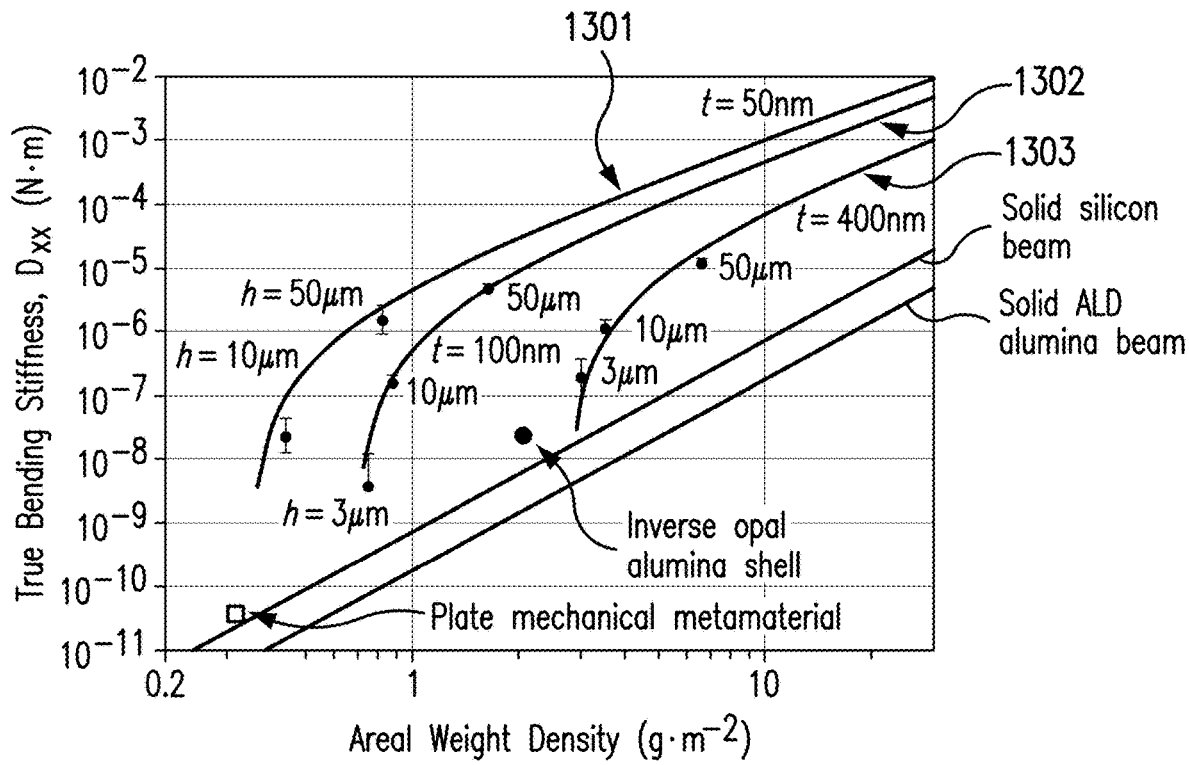
FIGS. 13A-D illustrate comparisons of the bending stiffness and spring constant enhancement factors (EF). (A) Comparison of the bending stiffness and areal density of the nanocardboard structure to other plate materials. (B) Enhancement factor for the bending stiffness of nanocardboard versus the cantilever height for the experimentally used basketweave parameters. (C) Density and contour plots of the enhancement factor for the spring constant, which considers both shear and bending deformations, versus the plate height and the webbing rectangle length. (D) Same as (C) based on the interpolated results of finite element simulations.

Comparison of Nanocardboard Stiffness:

FIG. 13A compares the bending stiffness of the nanocardboard structure to previously reported materials of similar micron-scale height and millimeter-scale lateral dimensions (i.e., t=50 nm data 1301, t=100 nm data 1302, t=400 nm data 1303). Analogously to Ashby charts that compare elastic modulus to density for bulk materials, this figure plots the natural figures of merit for lightweight plate-like materials: true bending stiffness versus areal mass density. To provide a simple baseline, FIG. 13A also includes the bending stiffness of solid silicon and ALD alumina plates, for which $$D_{solid} = \frac{Et^3}{12(1-v^2)} = \frac{E \, AD^3}{12(1-v^2)\rho_s^3}, \quad (13)$$

where AD is the areal density and $\rho_s$ is the standard volumetric density of the solid silicon or alumina.

At the lightest end of the graph, below 1 g m$^{-2}$, the 50-nm thick plates outperform our previously reported ultralight corrugated plate mechanical metamaterials. The taller versions of nanocardboard are also much stiffer than another reported alumina-based plate-shaped metamaterial that used the inverse-opal microarchitecture. In addition to engineered plate materials, nature also provides an example of a nano/microscale sandwich structure in the silica skeleton of diatoms. To date, the bending stiffness of this diatom shell has not been directly measured, though the reported Young's modulus of the biosilica composite (~36 GPa or less) suggests that the diatom shell is more compliant than the ALD nanocardboard.

Optimization of Stiffness and Spring Constant

Figure 13B:
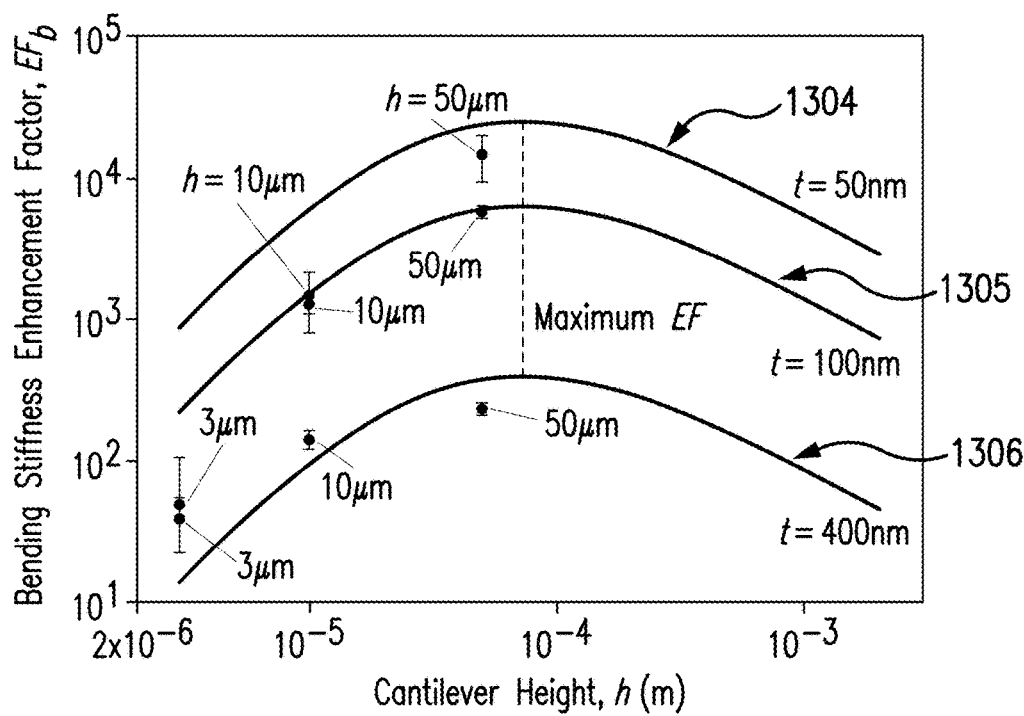

Following the literature on macroscopic sandwich plates and other hollow structures, the enhancement factor or shape factor was defined as the ratio of the bending stiffness of the nanocardboard sandwich structure to that of a solid beam with the same areal density. For macroscale structured beams and plates, including sandwich plates, the maximum practical enhancement is typically less than 100. This limitation is not intrinsic to the sandwich structure since the enhancement factor scales with the plate height and inversely with the face sheet thickness. Rather, these practical limits are determined by the minimum achievable thickness of the face sheets, the cell size of the core material, the added weight of the adhesive, material fracture strength, or machining limits for the cores if they are brazed to the face sheet. The nanocardboard structure offers a unique platform to overcome these limitations because the face sheet thickness can be scaled down to tens of nanometers while the glue is avoided altogether since the entire structure is created in a single deposition step. FIG. 13B compares the bending stiffness enhancement factor, EF of the nanocardboard structure with micron-scale height and millimeter-scale lateral dimensions (i.e., i=50 nm data 1304, t=100 nm data 1305, t=400 nm data 1306). Based on the analytical optimization shown in FIG. 13B, the maximum bending stiffness enhancement factor for nanocardboard was achieved when the weight of the core elements equaled the weight of one face sheet, which enhanced the bending stiffness by more than four orders of magnitude for the geometric parameters.

Figure 13C:
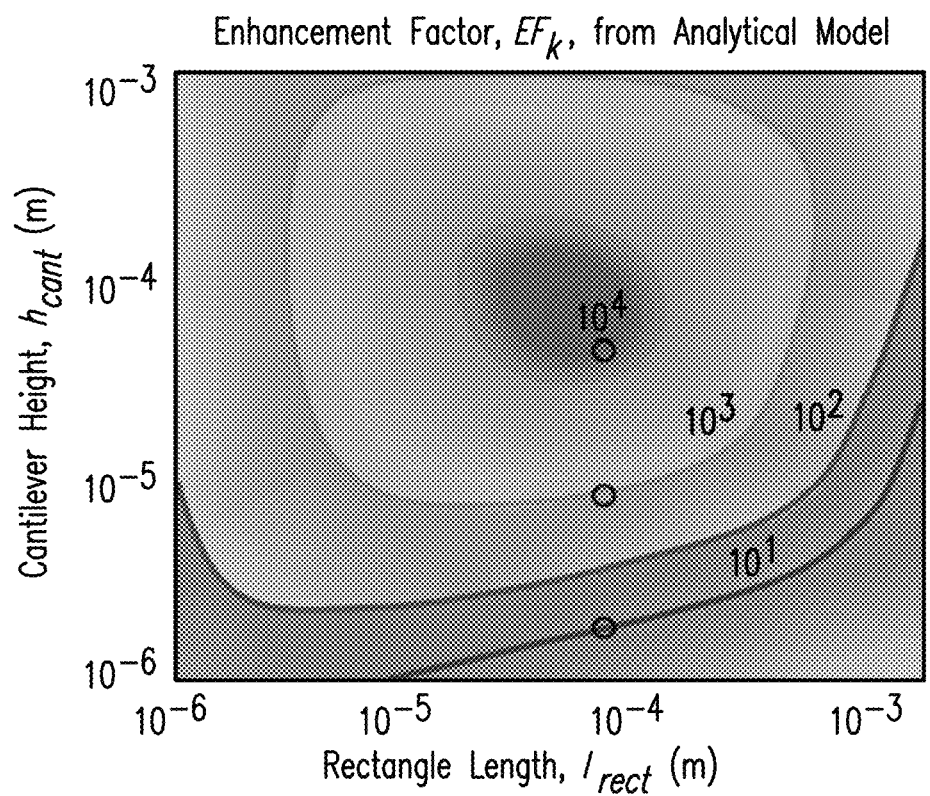
Figure 13D:
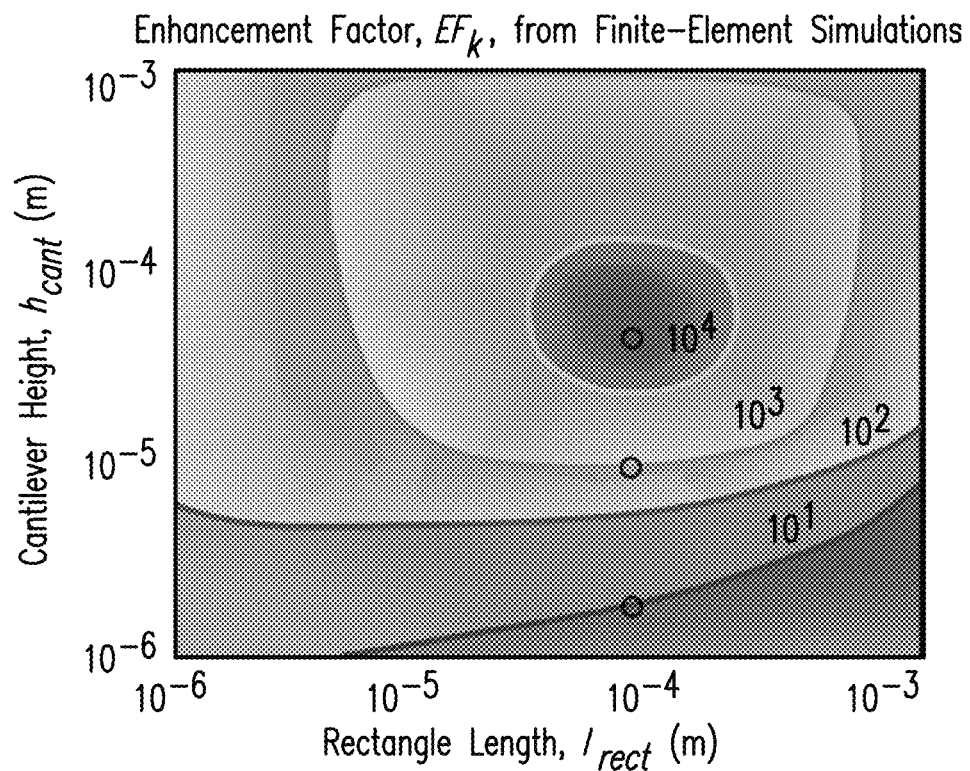

Although one can, in principle, increase the bending stiffness indefinitely by increasing both the height and webbing spacing/scale, the resulting cantilever will become extremely soft with respect to shear displacements. In typical applications, shear stiffness need to be optimized concurrently with the bending stiffness to maximize the overall spring constant of the cantilevered plate. As shown in FIGS. 13C and 13D, the maximum enhancement of the spring constant $EF_k$ (relative to a solid plate of the same weight) is achieved at the optimal values of the height and the webbing rectangle length, which are proportional to the geometric mean of the cantilever length and the film thickness, $\sqrt{Lt}$, and therefore exceeds four orders of magnitude for the experimentally used parameters. As can be seen from FIGS. 13C and 13D, the results of the analytical model and finite-element simulations agree, showing that for the specific cantilever length of 9 mm and film thickness of 50 nm, the 50-micron-tall nanocardboard plate achieves nearly the optimal enhancement factor. This optimal design analysis can be extended to other lengths and thicknesses as well as from cantilevered plates to doubly clamped plates, membranes clamped on all sides, or other boundary conditions.

Discussion

In summary, this work introduces nanocardboard as a new ultralight nanometer-thick plate mechanical metamaterial with exceptional flatness, stiffness, and ultralow areal density ($<0.5$ g m$^{-2}$). The experimental results are well supported by finite element simulations and a bi-rod-derived analytical model that correctly predicts the scaling of the bending stiffness and shear modulus versus plate thickness t and sandwich height h. Even after taking into account the shear, the nanocardboard plates with optimal webbing parameters offer spring constants that are four to five orders of magnitude larger than that of solid plates of the same areal weight.

Promising applications of nanocardboard include the wings of ultralight microflyers and hollow AFM probes. As a wing material for microflyers, nanocardboard can exhibit a low areal density while maintaining a relatively high bending stiffness and a high flexural resonant frequency, a combination of characteristics that is challenging to achieve in typical polymer film wings. In addition, the extremely low weight and high thermal insulation of nanocardboard plates enable microflyers based on new propulsion principles such as the photophoretic forces, also known as Knudsen or radiometric forces. The same combination of properties makes nanocardboard an excellent mechanical substrate for a light sail that can be used for interstellar travel. As an AFM probe, nanocardboard can provide high stiffness and frequency for sensitive measurements/imaging while also reducing the quality factor to enable high frame-rate scanning. Finally, as a chemical sensor it can offer an extremely high surface area in combination with high robustness and a high flexural resonance frequency, allowing sensitive and fast measurements. Other potential applications include acoustic metamaterials, high-temperature thermal insulation and other micromechanical systems for vacuum, gas, and liquid environments.

Example 3: Fabrication and Characterization of Nanocardboard

This Example describes exemplary designs and characteristics of the disclosed nanocardboard.

Materials and Methods

Silicon Mold Fabrication

Silicon-on-insulator wafers were coated with a thin film of silicon oxide and then silicon nitride via plasma-enhanced chemical-vapor deposition to serve as the hard mask for photolithography (Oxford Plasmalab 100 PECVD). The wafers were then coated with hexamethyldisilizane to promote adhesion (MicroChem MCC Primer 80/20), baked at 115° C. on a hotplate for 1 min, and coated with a photoresist layer (Shipley Microposit S1818), and again baked at 115° C. on a hotplate for 1 min. The photomask pattern consisted of both the webbing pattern and also outlines for samples (chips) of 13-mm diameter circles. The photoresist was exposed with vacuum contact photolithography (Suss MicroTec, MA6 Gen 3, 300-500 mJ/cm$^2$), and developed in MF-319 (Shipley Microposit) for 1-1.5 min, followed by rinse in deionized water and drying under $N_2$ flow. The wafers were then heated on a hotplate at 115° C. for 1 min to harden the resist layer.

In order to transfer the pattern in the photoresist, sequential reactive ion etching processes were performed. The webbing and outline pattern was transferred to the silica hard mask through $CHF_3/O_2$ reactive ion etching (RIE) (Oxford 80 Plus) until all of the silica was removed via inspection with an optical microscope and spectral reflectometer. An RIE of $CF_4$ was used to remove the final oxide and etch slightly into the silicon. The pattern was then transferred into the silicon via deep reactive ion etching (SPTS) of $SF_6$ and $C_4F_8$. The time, number of cycles, and power was calibrated such that the silicon device layer was completely etched through to the buried oxide. Table 1 provides analytically calculated areal density of the tested nanocardboard plates based on the as-designed webbing geometry and an alumina density of 3900 kg m-3. For the experimental samples, the actual weight was lower than this calculated weight by around 10%, therefore suggesting that the density of our ALD alumina is lower than assumed or some of the alumina was etched during the release.

TABLE I

Table 1. Area Density of exemplary nanocardboard plates.

| Areal Density (g m$^{-2}$) | | Height (μm) | |
|---|---|---|---|
| | 3 | 10 | 50 |
| Thickness (nm) 50 | 0.375307 | 0.441856 | 0.822133 |
| 100 | 0.750615 | 0.883712 | 1.644266 |
| 400 | 3.00246 | 3.534848 | 6.577064 |

Silicon Mold Removal from Handle Wafer

To remove the samples/chips from the wafer, the wafer was immersed upside down in a bath of 49% hydrofluoric acid for >1 hour to etch the oxide hard mask and buried oxide layer. After carefully rinsing with deionized water, a few of the chips self-released from the wafer, though most of the chips remained stuck. To remove the rest of the chips, a razor blade was inserted between the chip and the handle wafer inside of a water bath, lifting the chip from the wafer. All of the released chips were air dried.

Atomic Layer Deposition

The structural alumina was deposited with atomic layer deposition on individual chips (Cambridge Nanotech S200 ALD). Chips were taped to a custom glass carrier such that both the top and bottom sides were exposed for deposition. The deposition process was carried out at 250° C. with a pulse of H$_2$O vapor for 0.015 sec, delay of 5 sec, pulse of tetramethylaluminum for 0.015 sec, and delay of 5 sec. Each cycle deposited an incomplete layer of amorphous aluminum oxide of 0.9 to 1.0 angstrom. The final deposited thickness on a separate piece of prime silicon was measured with spectral reflectometry (Filmetrics, F40 model).

Laser Machining of Cantilevers and Mounting

ALD coated chips were taped to a flat carrier wafer for laser micromachining into individual cantilevers of 2-12 mm length and 0.5 mm width. An IPG IX280-DXF green laser at 50% power and 100 kHz rep rate was used to define the outline of the cantilevers. Between 1 and 250 repetitions of the outline was required completely etch through the chip, depending on the thickness. After etching, the cantilevers were mounted on glass slides with UV-curing epoxy (Loon Outdoors, High Viscosity). During mounting, damage to the cantilever was minimized and the epoxy creeping along the cantilever beyond the section of the cantilever that contacted the glass glide was limited.

Etching of Silicon Mold

The silicon mold was etched with XeF$_2$ vapor (Xactics/SPTS), leaving only the hollow nanocardboard structure. For the etching of large pieces, the edges of the chips were slightly fractured with a razor blade as to expose an etch surface of the inner silicon. They were mounted on a glass slide and covered with aluminum foil as to prevent the nanocardboard device from moving during etching. Full etching required >500 cycles at 60 sec cycle time and 2 T pressure. For nanocardboard cantilevers, the mounted slides were covered with aluminum foil, though etching required fewer cycles as more surface area of the silicon was exposed and less total silicon required etching. The etching was completed when the nanocardboard became optically translucent and the dark silicon region had clearly disappeared.

Atomic Force Microscopy Characterization

Figure 16:
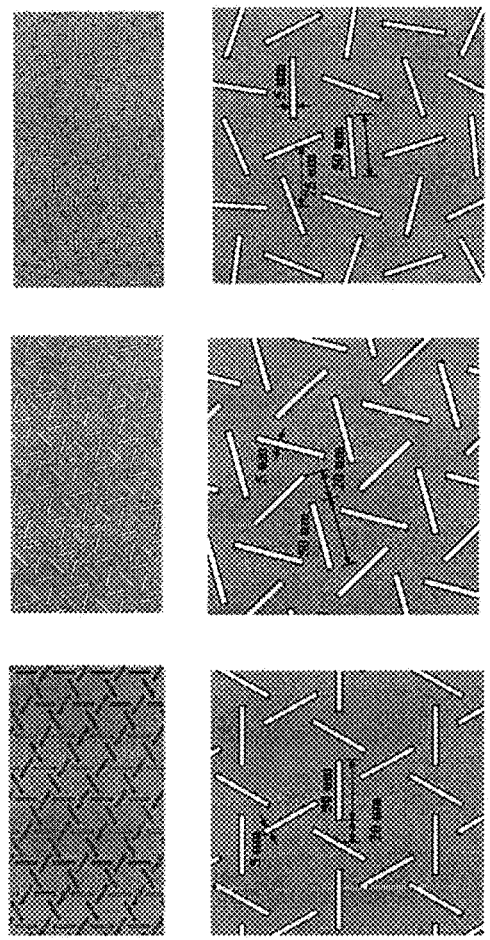
FIG. 16 provides schematics of the simulated perforation/webbing patterns.

In order to characterize the spring constant of fabricated cantilevers, an atomic force microscope (AFM) (Asylum MFP-3D) was used at room temperature and calibrated, commercial AFM probes. The spring constant of the AFM probes was determined by using the Sader method integrated into the IGOR software (Version 6.37). For each set of data (a displacement curve at a particular length along the nanocardboard cantilever), the base of the nanocardboard cantilever was determined through an optical microscope, and then took measurements (by measuring the reaction displacement of the AFM probe as it moved through a z-displacement of 10 μm) every 5 unit cells towards the tip by moving the stage with micrometers. AFM displacement measurements were taken at a speed of 1 or 2 sec per measurement. In order to extract the cleanest measurement, displacements were required per location before converging on the expected "hockey stick" shaped curve. When possible, measurements were performed at more than one point along the width of the cantilever and averaged the respective spring constant values. For each of the data points presented in FIG. 12, only a single cantilever was tested, but FIG. 16 presents the bending testing of many dozen different cantilevers at only the tip to show that the characteristics are consistent and reproducible. The raw z-stage position and calculated nanocardboard deflection data for each measurement for post-processing were exported.

To calculate the spring constant, the force displacement graph (raw z-position vs. nanocardboard cantilever force as calculated by the AFM probe calibration) was plotted and the contact portion of the curve was chosen to be fitted with a linear line. This chosen portion was the first 300 nm of AFM head displacement, as that was the limit of our simulation capabilities for small deflection. In some cases, the noise in the data was too large to obtain representative data from only the first 300 nm. In these cases, many micrometers of displacement were chosen for the fitting lines as to average out the noise. The slope of the fitting line was the spring constant of the combined nanocardboard cantilever and AFM probe, $k_{total}$, which was then used calculate the individual nanocardboard cantilever spring constant, $k_{cant}$, as $1/k_{total}=1/k_{probe}+1/k_{cant}$. The value of $k_{cant}$ was then used to calculate the apparent bending stiffness $D_{app}$ of that cantilever at the respective location. The apparent bending stiffness values used in this report were normalized by the width of the cantilevers, which was nominally 0.5 mm, but measured directly with optical microscopy for each sample.

Weight Measurements

Samples were loaded onto the scale immediately after XeF$_2$ etching of the silicon mold. The readout resolution was 0.1 microgram, a precision of 0.2 micrograms, and accuracy of +/−6 micrograms. For comparison, tested samples weighed roughly 50-100 micrograms.

Testing in Liquids

Few samples were introduced to liquid environments after etching of the silicon mold. Samples were inserted into puddles of pure deionized water or acetone for up to 5 min. In certain cases, the samples would not sink under their own weight and required manual force in order to fully submerge. The liquid puddle was allowed to naturally evaporate under ambient conditions and then the evaporation of the liquid from the inter-face plate region was observed under optical microscopy.

Microscopy

Optical microscopy was performed with Zeiss Smartzoom5 2D/3D Optical Microscope and Zeiss Imager-M2m Optical Microscope under ambient conditions. Scanning electron microscopy (SEM) was performed on three different instruments. 1) JEOL 7500F High-Resolution Scanning Electron Microscope, accelerating voltage 5-15 kV, working distance 6-15 mm, in-lens detector. 2) FEI Quanta 600 Environmental Scanning Electron Microscope, accelerating voltage 5-20 kV, with and without water vapor. 3) FEI Strata DB235 Focused Ion Beam, accelerating voltage 5-15 kV, working distance 10 mm, SE detector.

Face Sheet Wrinkling and Perforation Pattern

The wrinkling or buckling of face sheets in sandwich structures, a well-known occurrence in macroscopic sandwich plates, can limit the predictability of the mechanical properties and the overall stiffness. For some designs of the nanocardboard, in which the webbing was a hexagonally-periodic array of cylinders (FIG. 15A), the wrinkling of the face sheet for thicknesses of 100 nm or less was observed (FIG. 15B). The wrinkles formed over entire cantilevers because the webbing cylinders were disconnected (not forming a continuous array like in honeycomb cores), and furthermore were widely spaced. FIG. 15C provides a diagram showing how a straight line can be drawn through the face sheet without intersecting any webbing cylinders. The face sheets can therefore buckle or wrinkle along these straight lines. Accordingly, the wrinkling was experimentally observed along the 0°, 60° and 120° directions of the hexagonal lattice (FIG. 15D). During mechanical characterization with an atomic force microscope probe, irreproducible stress-strain curves which were highly nonlinear was observed. The wrinkles moved and reoriented during each test, resulting in inconsistent mechanical responses.

In order to satisfy the "no-straight-line rule" and prevent wrinkling, the hexagonal cylinder motif was replaced with a simple basketweave motif for all subsequent experimental samples and numerical simulations. In the previous corrugated plates, a similar no-straight-line rule to increase the stiffness of corrugated single-layer plates was used. However, in nanocardboard, the no-straight-line rule does not necessarily increase the bending stiffness. Instead, its main purpose is to prevent the formation of wrinkles along straight lines that pass between the webbing cylinders and therefore produce plates with consistent and predictable mechanical properties. FIG. 15E shows how a straight line is not able to be drawn through a basketweave face sheet without being interrupted by the webbing rectangles, thus eliminating wrinkles.

There are other webbing patterns that one could formulate for the nanocardboard structure. The general requirements for the pattern include satisfying the no-straight-line rule, ensuring that the face sheet is continuous (or the perforations must not connect with one another), and the perforations must be as small as possible (generally ensuring high stiffness of the face sheet). Recently, researchers have reported on the mechanical properties of thins sheets with high aspect-ratio, periodic perforations, specifically investigating conditions with negative Poisson's ratio. The square basketweave pattern and the hexagonal kagome pattern are the two most studied patterns for their nearly-isotropic controllable elastic modulus and Poisson's ratio. Table 2 and FIG. 16 compare the simulated bending performance of basketweave nanocardboard cantilevers with a set of other perforation/webbing patterns based on that work. The simulated true bending stiffnesses, for thicknesses t of 100 nm and height h of 10 μm, are: hexagonal kagome pattern with an angle of 60 degrees, $8.2 \times 10^{-8}$ N m (the simulated bending stiffness for the 52 degrees condition was comparable), the analogous triangle motif, $9.8 \times 10^{-8}$ N m, and randomly-angled basketweave $9.2 \times 10^{-8}$ N m. All of these stiffnesses are similar, yet smaller than the measured true bending stiffness of the comparable basketweave-pattern nanocardboard samples.

Supplement Bending Stiffness Data and Discussion

Table 2 compares the bending stiffness of nanocardboard with between different webbing patterns.

TABLE 2

Comparisons of the bending stiffnesses of nanocardboard with between different webbing patterns.

| | Hexagonal kagome | Triangular motif | Randomly-oriented square basketweave |
|---|---|---|---|
| Basket-wave | $R = \dfrac{D^{bw}}{D^{hex}} = 1.975$ | $R = \dfrac{D^{bw}}{D^{tri}} = 1.65$ | $R = \dfrac{D^{bw}}{D^{ran}} = 1.76$ |

Figure 17:
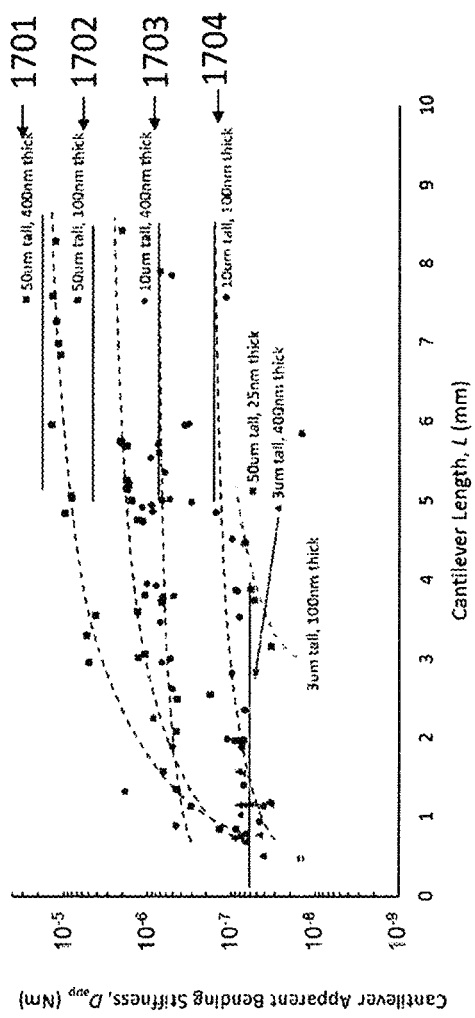
FIG. 17 provides plots of the apparent bending stiffness $D_{app}$ vs. cantilever length L for a variety of different experimental cantilevers displaced at the cantilever tip.

While nanocardboard cantilevers and larger pieces with an alumina thickness of 25 nm were fabricated, the bending stiffness for this thickness was not fully characterized due to lower repeatability and increased measurement noise; however, a few data points are provided in FIG. 17 for reference. Sample data with heights of roughly 50 μm and thickness of roughly 400 nm 1701, heights of roughly 50 μm and thickness of roughly 100 nm 1702, heights of roughly 10 μm and thickness of roughly 400 nm 1703, and heights of roughly 10 μm and thickness of roughly 100 nm 1704 were fully characterized with AFM bending measurements.

In addition to the bending stiffness ($D_{xx}$) calculated from the bending tests performed along the length of cantilevers, the apparent bending stiffness of samples was measured solely at the tips of cantilevers. While this data was not used to calculate the reported $D_{xx}$ and G, it does follow similar trends to the "along the length" data shown in FIG. 12 and matched well with numerical simulations. FIG. 17 shows a plot of all of these such data points, the apparent bending stiffness as a function of the length of the cantilever at the tip, to complement the discussion in the main text. There is significant variability (on the order of 10%) from sample to sample, representative of the experimental error and noise naturally present during the testing of >50 cantilevers of different parameters. Each condition follows the expected trend of increasing stiffness with length. The solid horizontal lines designate the theoretically expected and simulated saturated bending stiffness of each experimental condition.

TABLE 3

Bending stiffness and shear modulus (both normalized by cantilever width) obtained by fitting the experimental curves for the apparent bending stiffness. The error is provided by 95% confidence interval.

| Thickness (nm) | Height (μm) | Avg. True Bending Stiffness, $D_{xx}$ (Nm) | Error (Nm) | Avg. Shear Modulus, G (N m$^{-2}$) | Error (N m$^{-2}$) |
|---|---|---|---|---|---|
| 100 | 50 | 4.677E−06 | +/−4.55E−07 | 1.19E+04 | +/−9.42E02 |
| 100 | 10 | 1.598E−07 | +/−2.32E−08 | 3.60E+03 | +/−8.835E02 |
| 400 | 50 | 1.221E−05 | +/−1.16E−06 | 6.07E+04 | +/−8.49E03 |
| 400 | 10 | 1.146E−06 | +/−1.72E−07 | 1.40E+05 | +/−3.38E04 |
| 50 | 50 | 1.484E−06 | +/−5.35E−07 | 1.66E+03 | +/−2.845E02 |
| 50 | 10 | 2.303E−08 | +/−1.05E−08 | 2.97E+03 | +/−1.514E03 |
| 400 | 3 | 1.922E−07 | +/−8.01E−08 | 1.01E+05 | +/−5.14E04 |
| 100 | 3 | 3.800E−09 | +/−3.8E−09 | 4.10E+05 | +/−4.100E5 |

Figure 18A:
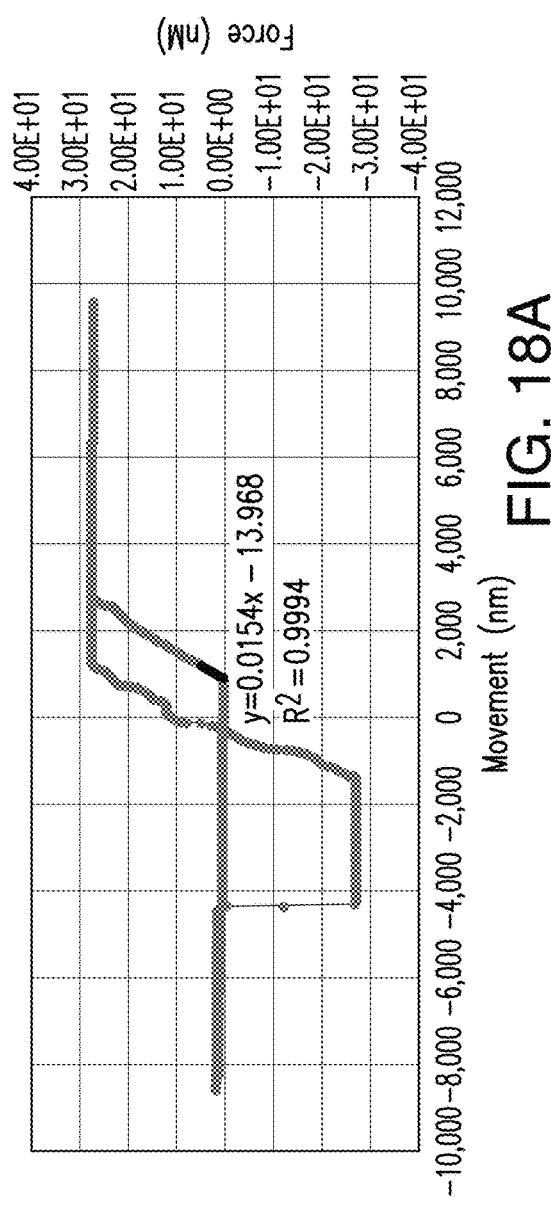
FIGS. 18A-C provide experimental and numerical simulation curves showing the mechanical response of cantilevers. (A and B) Example graphs of the force-displacement curves obtained from AFM mechanical testing of nanocardboard cantilevers at different locations. The thickness, height and cantilever length for these images were: (A) 50 nm, 50 µm, 1.47 mm (near the base) and (B) 50 nm, 50 µm, 5.64 mm (near the tip). (C) Fitted data for the along the length measurements.
Figure 18B:
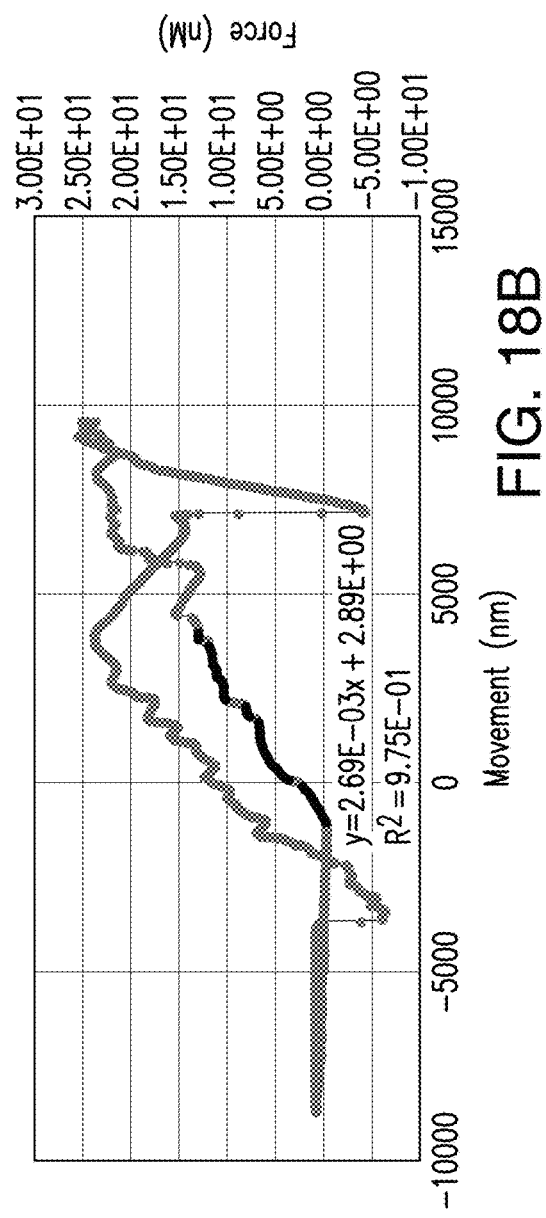
Figure 18C:
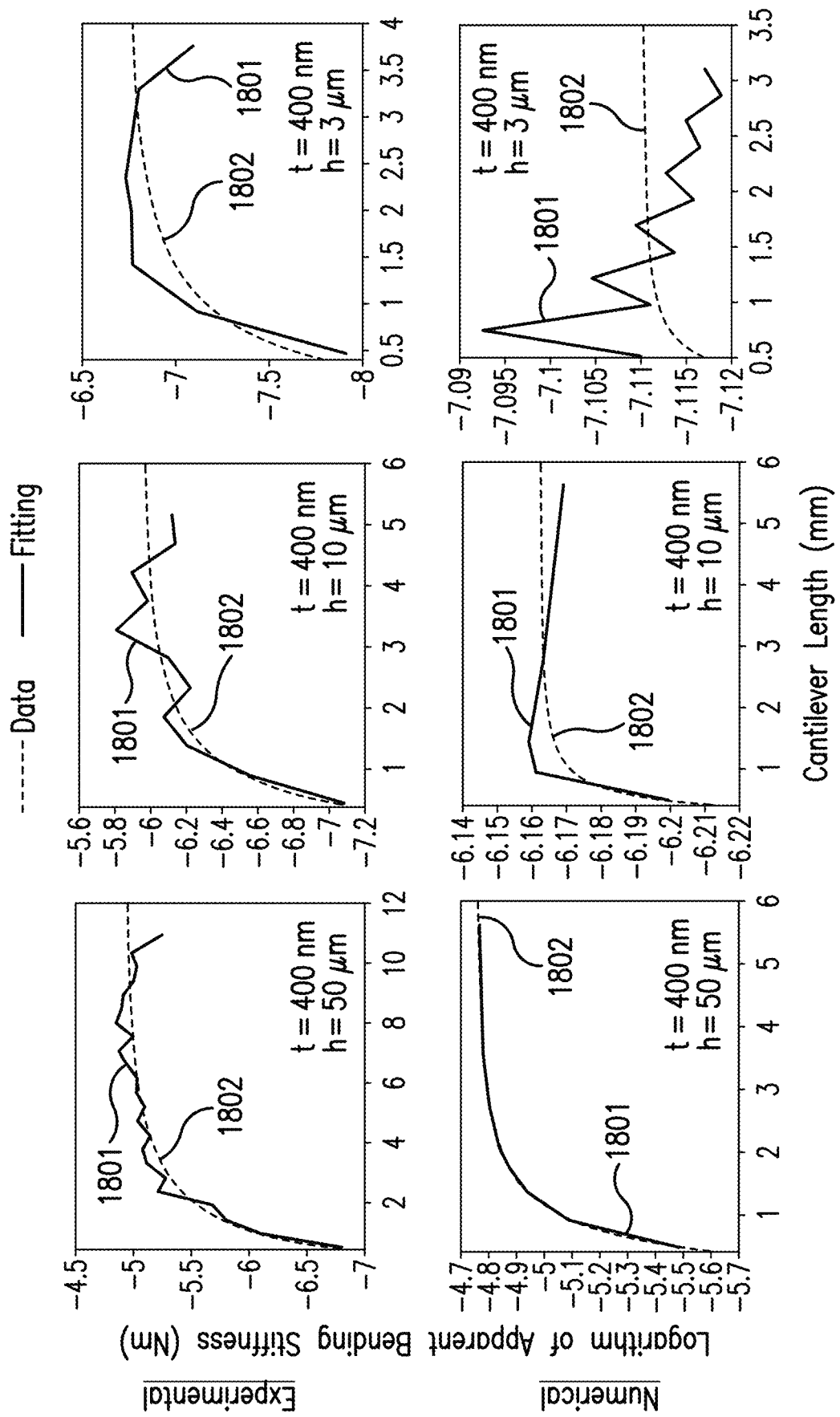

The data in Table 3 shows that the nanocardboard true bending stiffness scales as expected over an order of magnitude with both thickness and height. More specifically for $D_{xx}$ (FIG. 12C), the simulation fitting-determined data points matched the theoretical values within 19% relative error, suggesting that our numerical model provides an accurate prediction of the bending stiffness. Similarly, the experimental fitting-determined $D_{xx}$ data points match the theoretical trends (relative error <38%) at large t, large $D_{app}$ and high $L_{90}$ (t≥100 nm, h/t≥100). There are three major cases that incurred significant error in which the deviations are >50%. Firstly, for t=50 nm it was difficult to maintain a low relative error in the deposited thickness of the ALD alumina. The second deviation came from increased experimental noise during the AFM testing of low $D_{app}$ samples compared to relatively noise-free cantilevers with larger $D_{app}$ (See FIGS. 18A and 18B for example force-displacement curves). FIGS. 18A-C provide experimental and numerical simulation curves showing the mechanical response of cantilevers. The thickness, height and cantilever length for these images were: (A) 50 nm, 50 µm, 1.47 mm (near the base) and (B) 50 nm, 50 µm, 5.64 mm (near the tip). FIG. 18C provides data without fitting 1801 and fitted data 1802 for the along the length measurements. The fitting parameters allow one to determine the bending stiffness and the shear stiffness of the nanocardboard plate that the cantilever is made of.

Lastly, nanocardboard cantilevers with low h/t, or low $L_{90}$, had relatively fewer unsaturated $D_{app}$ data points available for accurate fitting. As for G (FIG. 12D), the simulation fitting-determined data points match the theoretical trends within 40% relative error except for: the nanocardboard cantilevers with 400 nm thickness, again where the fitting was error-prone due to the relatively few data points in the low L, shear-dominated region; and with 10 µm height. The experimental fitting-determined G data points only match (relative error <32%) with our theoretical model at large $D_{app}$ and high $l_{90}$ (h=50 h/t≥500), where the exceptions can also be attributed to the second and third reasons described above.

Finite Element Simulations of Nanocardboard

Figure 20A:
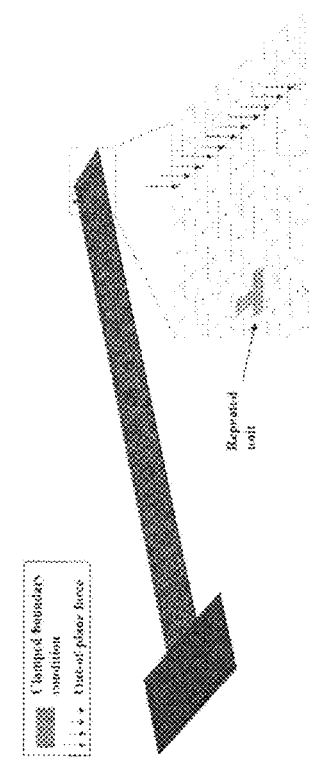
FIG. 20A provides configuration, boundary and loading conditions of the FE model.

Numerical simulations were carried out to validate the experimental observation of the nanocardboard subjected to out-of-plane force. The nanocardboard model was designed in AutoCAD 2014 and then exported to Abaqus v6.11-2. FIG. 20A demonstrates the initial configuration, boundary and loading conditions of the cantilevered nanocardboard. To simulate the experimental setup of the cantilevered nanocardboard, a clamped boundary condition was applied to the left end of the beam, while the location of the external loading was changed along the beam length. Shell element (S4R) was used in the FE model. The calculation step was static without the consideration of Nlgeom. The geometric properties of the cases numerically simulated are summarized as follows: Unit length of 94 with 30 total units; cantilever width of 500 µm, cantilever height of 3, 10 and 50 µm and film thickness of 25, 50, 100 and 400 nm; Young's Modulus of 130 GPa and Poisson's ratio of 0.22; Element size of 10 µm and type of S4R.

Figure 20B:
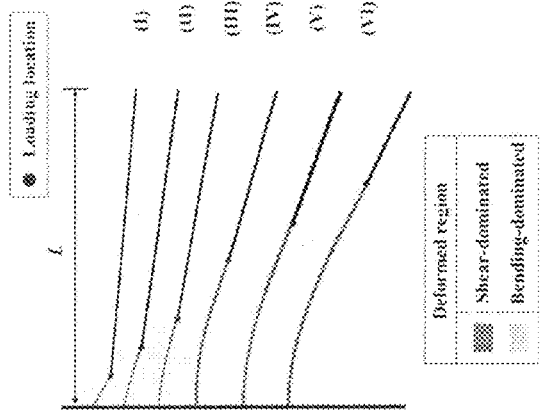
FIGS. 20B and 20C provide comparison of the deformed shape configuration of the nanocardboard by varying the loading location—(B) side view and (C) perspective 3D view.
Figure 20C:
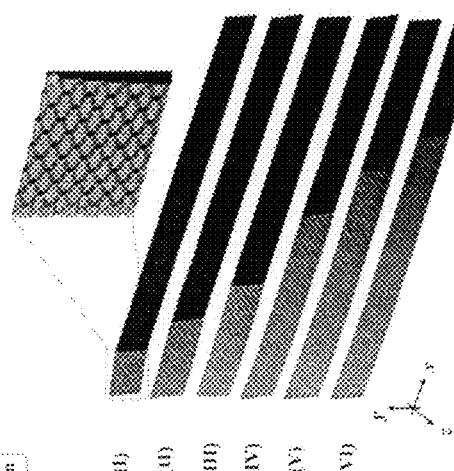

FIGS. 20B and 20C compare the deformed shape of the nanocardboard for different load locations in order to highlight shear- and bending-dominated deformation. The load location was varied as (I) 470 µm, (II) 940 µm, (III) 1410 µm, (IV) 2350 µm, (V) 3290 µm, and (VI) 3760 µm from the base of the cantilever. FIG. 20B displays the deformation configuration from a side view. The deformation is shear-dominated when the loading locations are (I) 470 µm, (II) 940 µm, and (III) 1410 µm, while bending is dominant when the loading locations are (IV) 2350 µm, (V) 3290 µm, and (VI) 3760 µm. FIG. 20C shows the corresponding nanocardboard deformation in a perspective 3D view. While these results are specific to a set of geometric conditions (500 µm width, 10 µm height, 0.05 µm thickness), the same trend can be observed for nanocardboard cantilevers of any conditions as is described the theoretical Section S7.

For the numerical simulation data presented in FIGS. 12B-D, the cantilever was displaced with a given load of $1\times10^{-12}$ N at different lengths, as described in the previous paragraph. The displacement of the cantilever was measured to extract the spring constant, and ultimately calculating the apparent bending stiffness for each particular condition. The curve of apparent bending stiffness vs. length was plotted and fitted. From the fitted function, the simulated true bending stiffness (N m) and shear modulus (N m$^{-2}$) were extracted. For certain geometric conditions, the fitted bending stiffness was verified by applying a pure bending moment in place of an out-of-plane force load, and measuring the resulting curvature of the deformed cantilever. Comparable results were obtained between the force- and moment-induced bending stiffnesses.

Figure 20D:
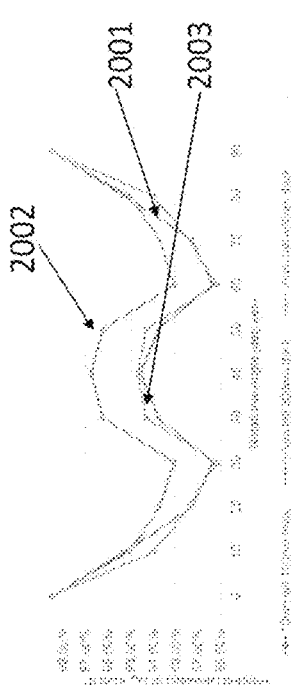
FIG. 20D provides plots showing reduction in bending stiffness for different orientations of the basketweave pattern with respect to the length of the beam direction.

FIG. 20D presents the effect of the pattern angle, i.e., the angle between the repeated unit and nanocardboard length, on the deviation of simulated bending stiffness. The pattern angle was varied from 0° to 90°, and three thicknesses were investigated (100, 300, and 400 nm). The deviation of simulated bending stiffness of nanocardboards with 100 nm thickness and 10 µm height 2001, 300 nm thickness and 10 µm height 2002, 400 nm thickness and 10 µm height 2003 was compared. Symmetric variations are obtained from all three cases. In particular, the minimum bending stiffness occurs when the pattern angle is 30° and 60°, with a relatively stiffening at 45°. The deviation of up to 15% was within the range of our experiment error.

Sharp Bending of Nanocardboard Cantilevers

The large-deformation bending of the nanocardboard cantilevers was carried out for select samples in order to determine minimum radius of curvature that could be attained without apparent fracture or plastic deformation. As has been shown with other bulk mechanical metamaterials, the use of elements with nanoscale thickness can allow for much larger failure-free deformations than would be expected from similar macroscale materials. Similarly, the disclosed nanocardboard plates were able to recover to their original position after being bent to have a radius of curvature <100 µm, as show in FIGS. 11H-K and 21. To achieve such extreme deformations, the free-end of nanocardboard cantilevers with an Omniprobe tip was spatially translated, first bending the cantilever down, and then compressing the cantilever until the free end contacted the clamping substrate in order to induce beam buckling. The obtained SEM images were used to measure the radius of curvature for different conditions of cantilever height, film thickness, and distance of the Omniprobe tip from the base of the cantilever. Note that while most of the bent cantilevers recovered to their initial positions, some of the cantilevers partially or completely fractured when the displacements were extreme or complex. Certain cantilever was also damaged by the sharp probe, which sometimes punctured the nanocardboard.

Figure 21A:
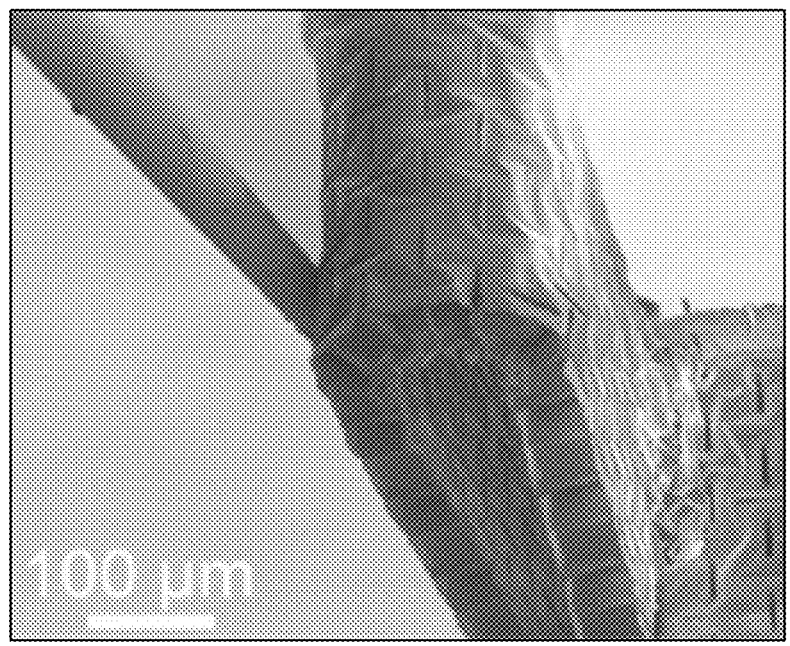
Figure 21B:
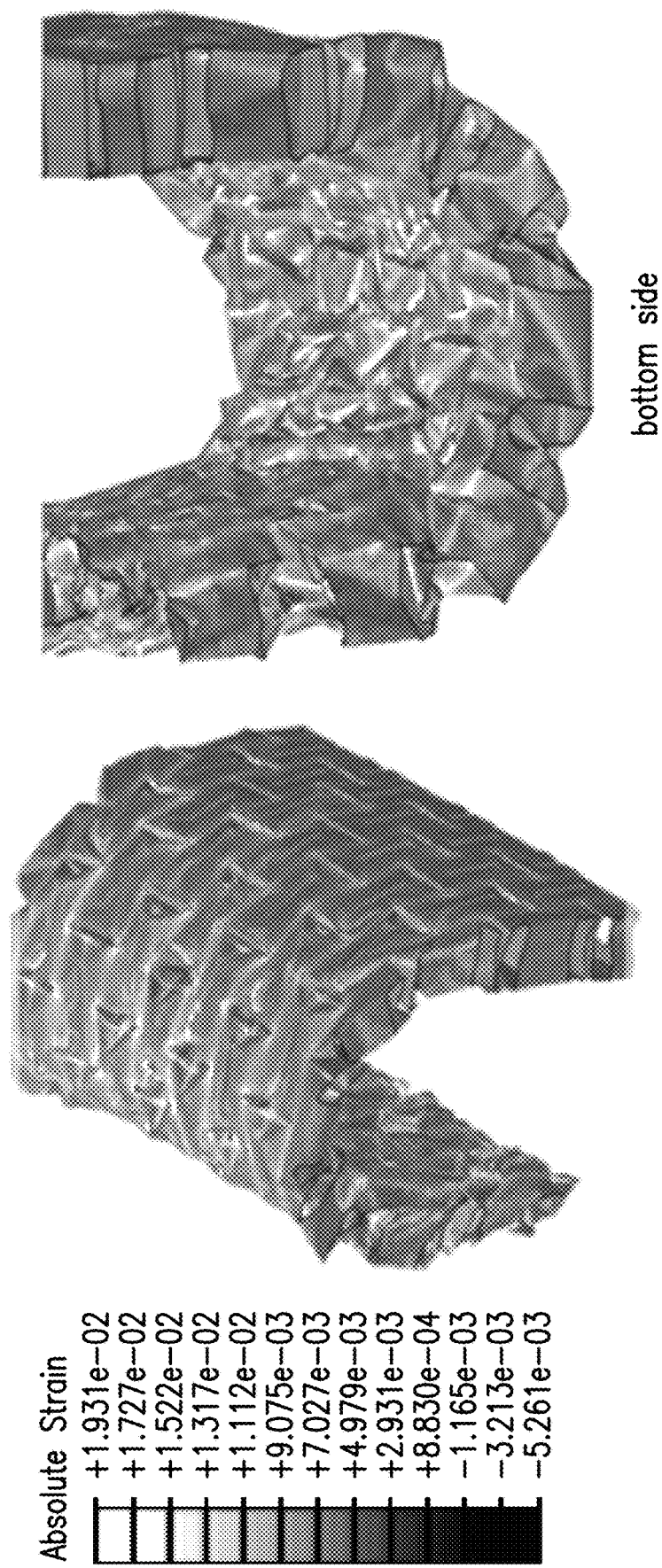
Figure 21C:
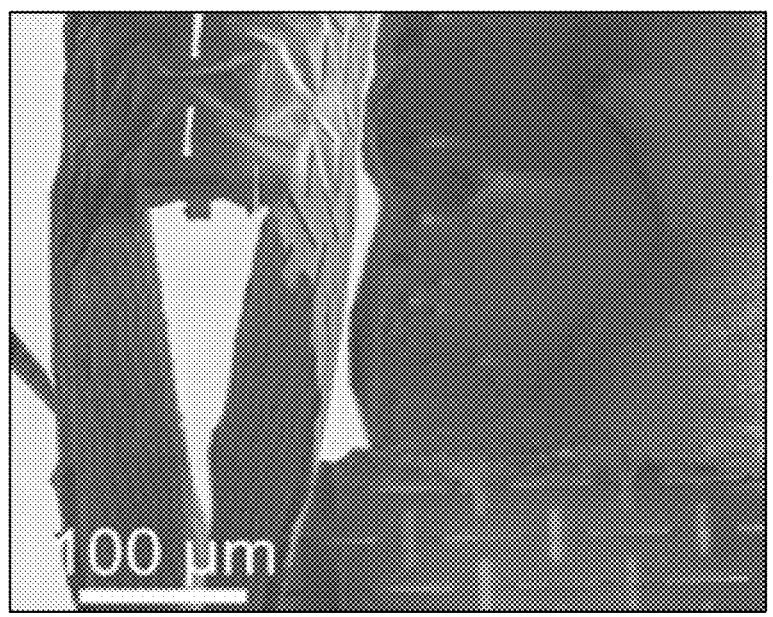
Figure 21D:
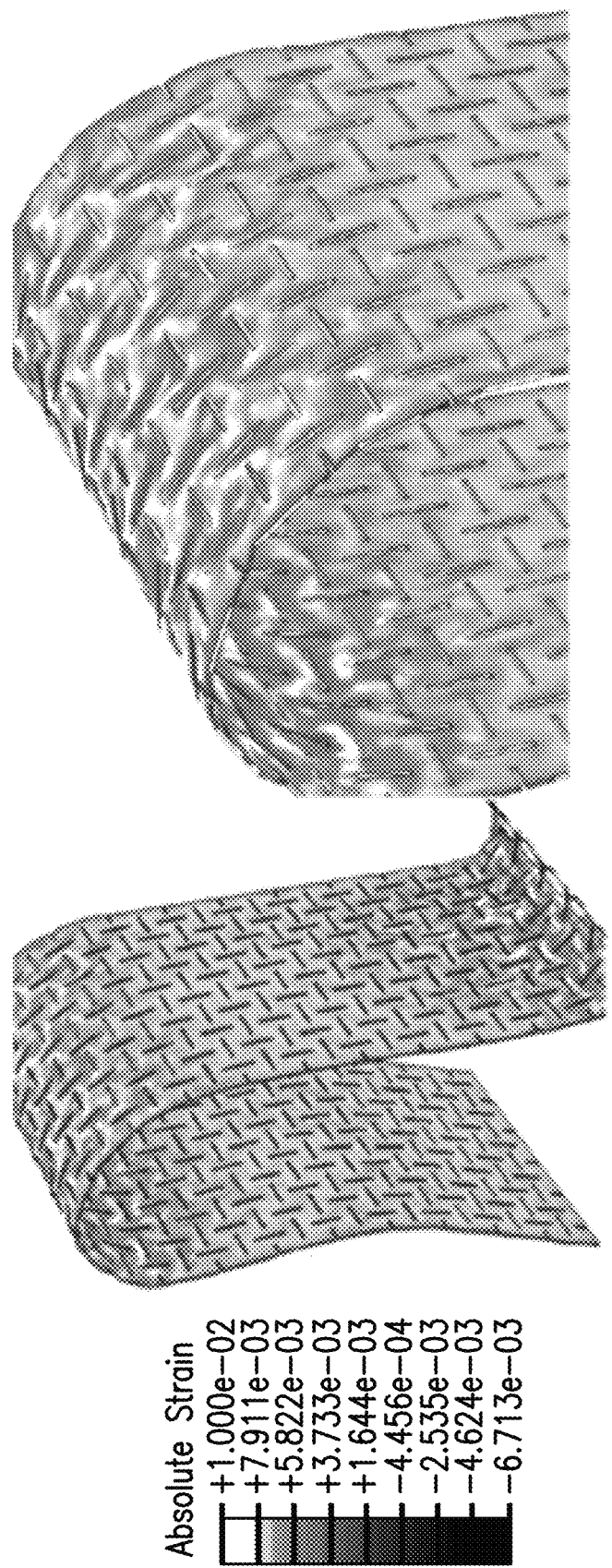
Figure 21E:
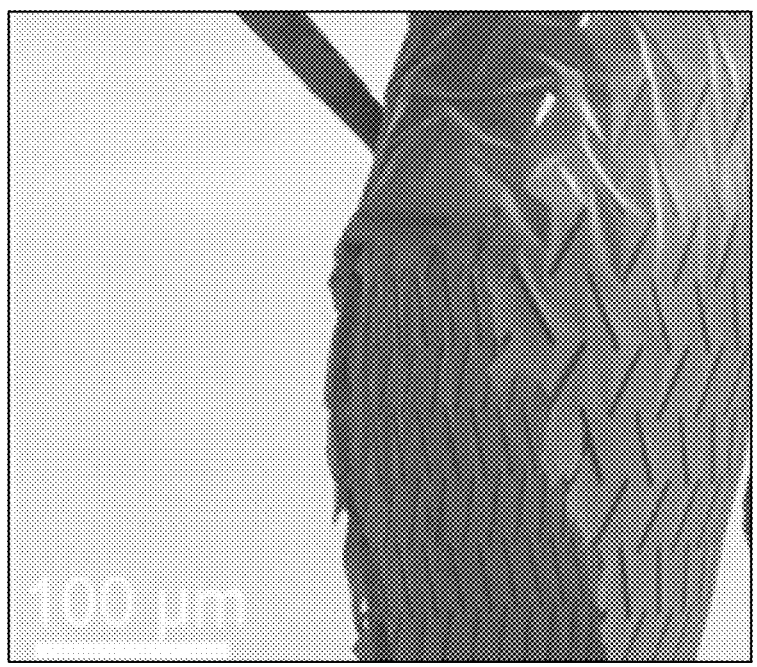
Figure 21F:
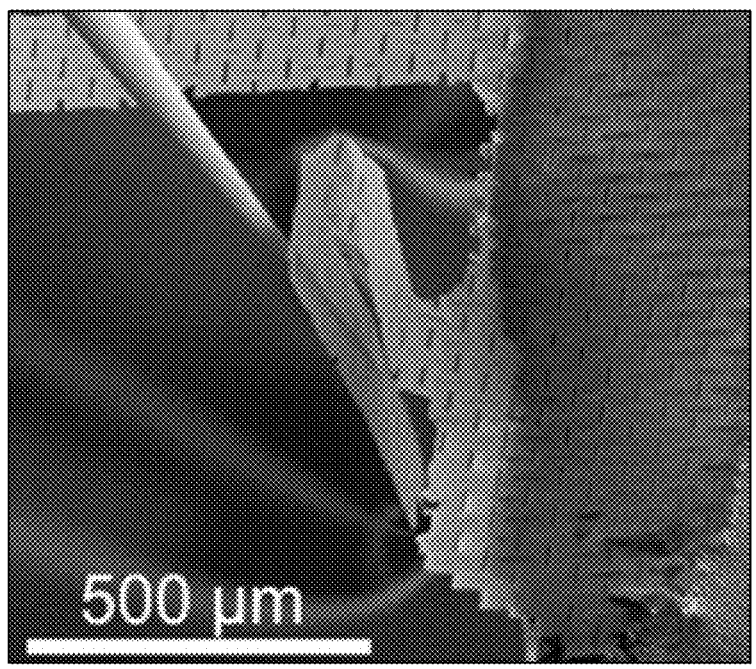
Figure 21H:
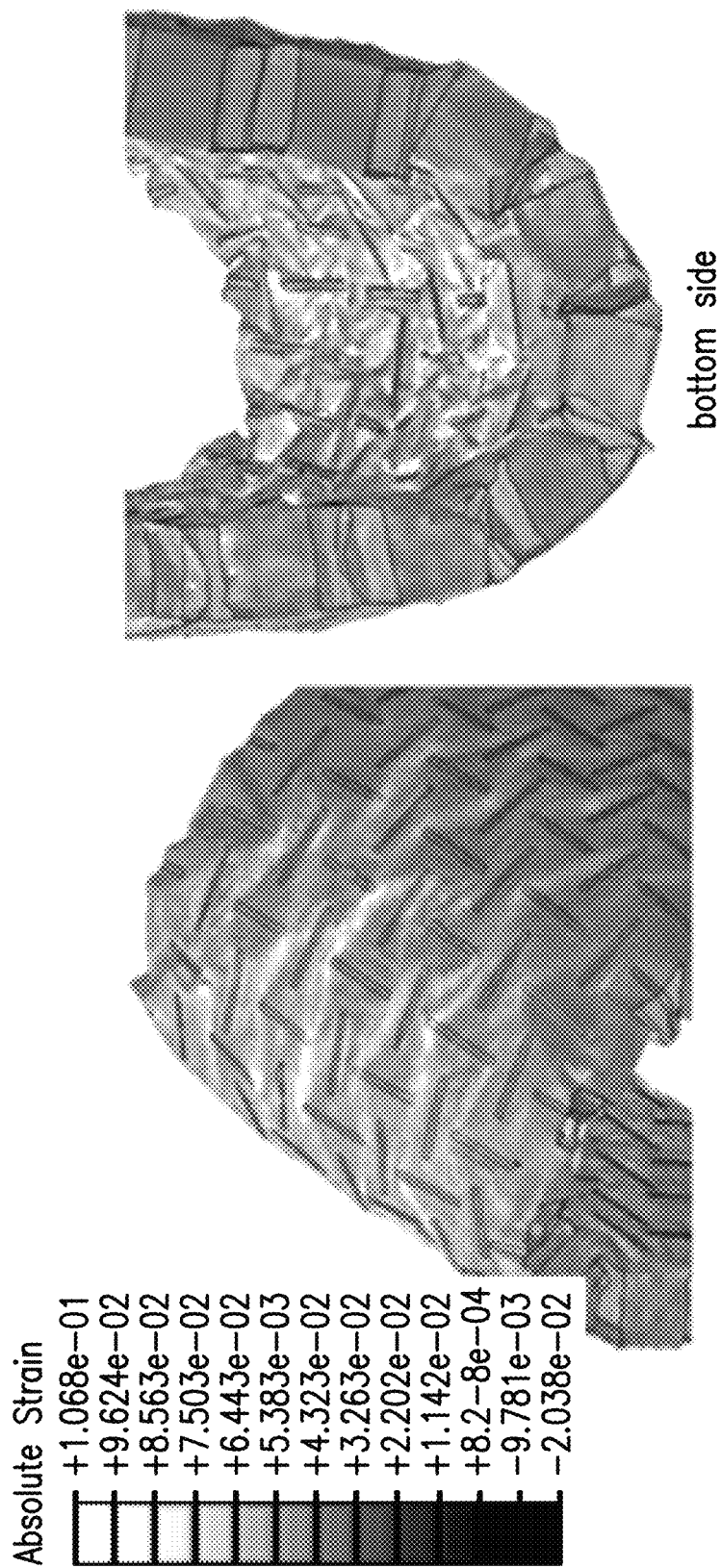

The finite element models of sharply bent cantilever used the same two steps as the experiments: 1) bending to introduce buckling imperfection, and 2) compression. To fully investigate the large deformation effects, the geometric nonlinearity was taken into account. In order to ensure convergence of the model, displacements were placed at the free end of the cantilever. In particular, a displacement in the transverse direction of half of the cantilever width was added in the bending step, and a displacement in the longitudinal direction of the cantilever length was placed for the compression step. FIGS. 21B, 21D, and 21G show images of the resulting deformation, where the colors represent the principle in-plane strains on the structure. The shapes of the deformations predicted by the FE model agree with the experiments. FIGS. 21H and 21I present the deformation of the sandwich-like structure with continuous face sheets. Comparing with the proposed cantilever, the large deformation-induced absolute strains of the continuous structure are approximately 5~10 times higher, which results in permanent damages to the sandwich-like structure. In contrast, the FE model studies suggest that the maximum local strain for the nanocardboard structure with the perforated face sheets was close to 1%, hence free from material strain failure as was the case in the experimental bending Optimal Design of the Cantilever Problem Statement—For cantilevers and plate structures, designing for the minimum deflection or maximum resistance to deflection is often desirable in a wide variety of situations, including transportation, construction materials, and biological skeletons or shells. Therefore, the optimization in this section seeks to maximize the spring constant of the cantilever $k_{cant}$ for any chosen areal density $AD_{cant}$. Since the shear component of deflection tends to dominate for cantilevers on the order of a few millimeters, the optimization is not as simple as maximizing the bending stiffness $D_{xx}$. In the following, the stiffest and lightest nanocardboard cantilever were analytically designed considering both bending and shear deformations. The optimization focuses on only the basketweave patterns that can be reliably fabricated and do not exhibit spontaneous wrinkling, but the derivation also provides insight into the maximum achievable enhancement factor of the structure and how the optimal designs scale for different geometric or density constraints.

Two design variables of the presented cantilever are particularly investigated, i.e., the cantilever height $h_{cant}$, and the rectangle length $l_{rect}$ of the basketweave pattern. Increasing the bending stiffness requires increasing the cantilever height, which also increases the mass of the cantilever. Increasing the shear stiffness, however, requires decreasing the rectangle length of the basketweave pattern, which also increases the mass of the cantilever. Therefore, for a fixed mass or areal density, there is a tradeoff between increasing the height to reduce the bending displacement and decreasing the rectangle length to reduce the shear displacement. Mathematically, the optimization can be described as $$\begin{cases} \text{Max}[k_{cant}(h_{cant}, l_{rect})] \\ \text{Subject to: } AD_{cant}(h_{cant}, l_{rect}) = \Gamma \end{cases} \quad (14)$$

where $\Gamma$ is an arbitrary value of the areal density of the cantilever.

The Lagrange multiplier method is used to optimize the cantilever. The Lagrange expression is defined as $$L(h_{cant}, l_{rect}, \lambda) = k_{cant} - \lambda AD_{cant}, \quad (15)$$

where $\lambda$ represents the Lagrange multiplier. Therefore, the optimization is rewritten as $$\begin{cases} \nabla_{h_{cant}, l_{rect}} L(h_{cant}, l_{rect}) = \left(\frac{\partial L}{\partial h_{cant}}, \frac{\partial L}{\partial l_{rect}}\right) = 0 \\ AD_{cant} = \Gamma \end{cases} \quad (16)$$

To derive the optimal $h_{cant}$ and $l_{rect}$, the expressions was used for the spring constant and areal density of the cantilever, described in the following sections.

Sprint Constant and Areal Density of the Cantilever

Spring Constant—Following Timoshenko beam theory, the deflection $\delta_{cant}$ of the cantilever consists of two components, i.e., bending-induced and shear-induced deflections, which are given as $$\begin{cases} \delta_{bending} = \dfrac{20 F L_{cant}^3}{9 E t_{cant} h_{cant}^2 W_{cant}} \\ \delta_{shear} = \dfrac{F L_{cant}}{G h_{cant} W_{cant}} \end{cases}, \quad (17)$$

and the total cantilever deflection is $$\delta_{cant} = \delta_{bending} + \delta_{shear}. \quad (18)$$

The spring constant of the cantilever is, therefore, given by:

$$k_{cant} = \frac{F}{\delta_{cant}} = \frac{9 E G h_{cant}^2 t_{cant} W_{cant}}{20 \eta L_{cant}^3 + 9 E h_{cant} L_{cant} t_{cant}}, \quad (19)$$

where E is the Young's Modulus of the solid material and the shear modulus is $$G = \eta \frac{t_{cant}^3}{h_{cant} \left(\frac{w_{rect}}{2} + l_{rect}\right)^2}, \quad (20)$$

where $\eta$, $l_{rect}$, and $w_{rect}$ refer to the shear modulus constant of the plate metamaterial (obtained empirically by fitting experimental and finite element results), webbing rectangle length and webbing rectangle width of the basketweave, respectively. To simplify the optimization, below that the rectangle width is assumed to be negligible ($w_{rect}=0$) while the gap is half of the rectangle length $$\left(g_{rect} = \frac{l_{rect}}{2}\right).$$

These are reasonable approximations of the actual nanocardboard webbing design implemented in experiments and numerical simulations, which used finite but small rectangle width. Note that these idealized parameters still satisfy the no-straight-line rule, i.e., $$g_{rect} \leq \frac{1}{2}(l_{rect} - w_{rect}),$$

to prevent wrinkling and give a bending stiffness $D_{xx}$ equal to 30% that of the ideal bending stiffness $D_{ideal}$. Equation 20 is, therefore, reduced to $$G = \eta \frac{t_{cant}^3}{h_{cant} l_{rect}^2}. \quad (21)$$

Substituting Equation 21 into Equation 19, the spring constant of the cantilever is $$k_{cant} = \frac{F}{\delta_{cant}} = \frac{9E\eta h_{cant}^2 t_{cant}^3 W_{cant}}{20\eta L_{cant}^3 t_{cant}^2 + 9Eh_{cant}^2 t_{rect}^2 L_{cant}}. \tag{22}$$

Figure 14B:
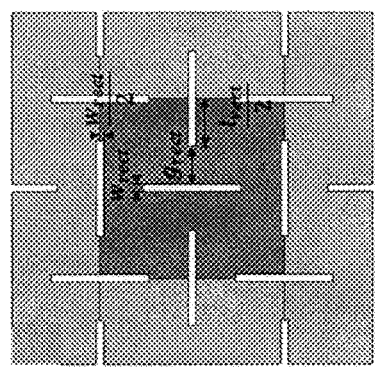
FIGS. 14A-B provide schematics of the disclosed nanocardboard plate (A) Geometric parameters of the nanocardboard plate, including thickness, gap between webbing, length of webbing rectangle, width of webbing rectangles, and plate height. (B) Top-down schematic of (A) showing the geometric parameters within a single unit cell.
Figure 14A:
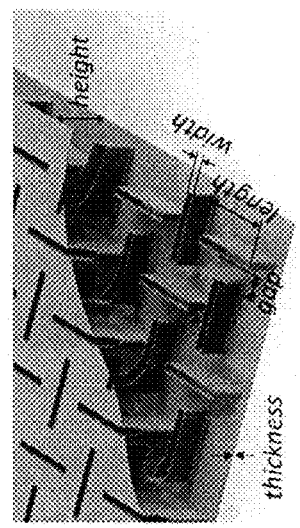

Areal Density—The areal density $AD_{cant}$ of the cantilever is given as $$AD_{cant} = \rho_s(\alpha + \beta h_{cant}) t_{cant} \tag{23}$$

where $\rho_s$ is the density of the cantilever material. $\alpha$ and $\beta$, the unit areal density constants for the face sheets and core of the cantilever, respectively, are determined by the basketweave design pattern, as shown in FIG. 14, $$\begin{cases} \alpha = 2\dfrac{((2g_{rect} + l_{rect} + w_{rect})^2 - 4l_{rect} w_{rect})}{(2g_{rect} + l_{rect} + w_{rect})^2} & \text{(Face sheets)} \\ \beta = \dfrac{8(l_{rect} + w_{rect})}{(2g_{rect} + l_{rect} + w_{rect})^2} & \text{(Core)} \end{cases} \tag{24}$$

Using the simplifications $w_{rect} = 0$ and $$g_{rect} = \frac{l_{rect}}{2},$$

equation can be reduced to $$AD_{cant} = 2\rho_s t_{cant}\left(1 + \frac{h_{cant}}{l_{rect}}\right), \tag{25}$$

Where $$\begin{cases} \alpha = 2 \\ \beta = \dfrac{2}{l_{rect}} \end{cases} \tag{26}$$

Optimization of the Enhancement Factor for the Bending Stiffness, $EF_b$—The enhancement factor of the bending stiffness was defined as $$EF_b = \frac{D_{cant}}{D_{solid}} \tag{27}$$

for any pair of a nanocardboard cantilever and a solid rectangular beam that have the same length, width, mass, and, therefore, the same areal density, $AD_{cant} = AD_{solid}$. EF is similar to the bending shape factor $\Phi_B^e$ used to describe the enhanced bending stiffness incurred with reforming a solid cylindrical beam into a different shape with the same cross-sectional area. Note that the areal density of the rectangular solid beam can be calculated as $AD_{solid} = \rho_s h_{solid}$, taking into account Equations 25-26, the height of the solid beam with the same areal density as a nanocardboard cantilever is $$h_{solid} = (\alpha + \beta h_{cant}) t_{cant} \tag{28}$$

The equivalent height of the solid beam becomes $$h_{solid} = 2t_{cant}\left(1 + \frac{h_{cant}}{l_{rect}}\right). \tag{29}$$

The bending stiffness of a solid beam is $$D_{solid} = \frac{1}{12} E h_{solid}^3, \tag{30}$$

where for simplicity the Poisson ratio correction factor of up to $$\frac{1}{1 - v^2}$$

for wide beams was neglected. According to the numerical calibration, the bending stiffness of the nanocardboard cantilever is 30% of the ideal sandwich beam, which can be written as $$D_{cant} = 0.3 D_{ideal} \tag{31}$$

where the bending stiffness of the ideal sandwich beam is given by $$D_{ideal} = \frac{1}{2} E t_{cant} h_{cant}^2.$$

Therefore, the bending stiffness of the nanocardboard cantilever is $$D_{cant} = \frac{3}{20} E t_{cant} h_{cant}^2. \tag{32}$$

The enhancement factor of bending stiffness alone was defined as $$EF_b = \frac{9}{40} \frac{h_{cant}^2 l_{rect}^3}{t_{cant}^2 (l_{rect} + h_{cant})^3}. \tag{33}$$

If the aim is to maximize the bending stiffness alone, both the plate height and the rectangle length should be made as large as possible. If, however, the rectangle length is fixed due to some practical considerations, the enhancement factor can be maximized with respect to the cantilever height, yielding $$\begin{cases} h_{cant,opt} = 2\, l_{rect} \\ EF_{b,max} = \dfrac{1}{30}\left(\dfrac{l_{rect}}{t_{cant}}\right)^2 \end{cases} \tag{34}$$

which predicts an enhancement factor of approximately 33 333 for the rectangle length of 50 μm and thickness of 50 nm. An example plot of $EF_b$ vs. AD is given in FIG. 24A for a cantilever length L of 2 mm. Note that the maximum EF 2404 occurs at the peak of each thickness curve. FIG. 24A shows the optimal bending stiffness enhancement factor plotted vs. the areal mass density of a beam for three different thicknesses t=50 nm 2401, 100 nm 2402, and 400 nm 2403. FIG. 24B provides the maximum EF 2408 and the spring constant enhancement factor of a beam for three different thicknesses t=50 nm 2405, 100 nm 2406, and 400 nm 2407. For the actual basketweave rectangle width and gap used in experiments, the absolute maximum enhancement factor is somewhat smaller as illustrated by FIG. 13B.

In summary, the bending stiffness can in principle be increased indefinitely by increasing both the height and rectangle length. However, the resulting cantilever will become extremely soft with respect to shear displacements. Therefore, the optimization of the bending stiffness alone makes sense only in cases where the cantilever is very long, and therefore bending dominated, and the scale of the basketweave pattern is fixed (note that the period of the basketweave pattern is equal to twice the rectangle length).

Enhancement Factor for the Spring Constant $EF_k$—the enhancement factor of spring constant was defined as $$EF_k = \frac{k_{cant}}{k_{solid}}, \tag{35}$$

where $k_{cant}$ represents the spring constant of the nanocardboard cantilever, $k_{solid}$ refers to the spring constant of a solid beam that has the same optimal areal density as the cantilever, $AD_{cant} = AD_{solid}$. Given that $AD_{solid} = \rho h_{solid}$, the height of the solid beam with equivalent mass is $$h_{solid} = 2t_{cant}\left(1 + \frac{h_{cant}}{l_{rect}}\right). \tag{36}$$

To compare the spring constant between the cantilever and solid beam, the structures were assumed to have equivalent material density $\rho_s$. Since the equivalent solid beam will be much longer than it is thick, the shear deflection can be neglected, and the deflection of the solid beam subjected to tip load F is then $$\delta_{solid} = \frac{FL_{solid}^3}{3EI_{solid}}, \tag{37}$$

where $$I_{solid} = \frac{W_{solid} h_{solid}^3}{12},$$

$W_{solid} = W_{cant}$ and $L_{solid} = L_{cant}$. Therefore, the spring constant of the equivalent solid beam is $$k_{solid} = \frac{F}{\delta_{solid}} = \frac{2EW_{solid}t_{cant}^3}{L_{solid}^3}\left(1 + \frac{h_{cant}}{l_{rect}}\right)^3. \tag{38}$$

In order to obtain the optimal enhancement factor $EF_{k,opt}$, the spring constant of the cantilever $k_{cant}$ is maximized with respect to the cantilever height $h_{cant}$ and rectangle length $l_{rect}$. In particular, substituting Equation 22 and 25 into Equation 16, the optimal cantilever height $h_{cant,opt}$ and rectangle length $l_{rect,opt}$ can be determined as $$\begin{cases} h_{cant,opt} = \sqrt[4]{\frac{5\eta}{9E\rho_s^2}} \sqrt{L_{cant}(AD_{cant} - 2\rho t_{cant})} \\ l_{rect,opt} = 2\sqrt[4]{\frac{5\eta}{9E}} \sqrt{\frac{L_{cant}\rho_s}{AD_{cant} - 2\rho_s t_{cant}}} t_{cant} \end{cases} \tag{39}$$

where the bending deflection of the optimal cantilever is identical to the shear deflection as $$\delta_{bending,opt}(h_{cant,opt}, l_{rect,opt}) = \delta_{shear,opt}(h_{cant,opt}, l_{rect,opt}). \tag{40}$$

and the optimal spring constant $k_{cant,opt}$ can be determined as $$k_{cant,opt} = \frac{3\sqrt{E\eta}}{8\sqrt{5}} \frac{t_{cant} W_{cant}}{L_{cant}^2 \rho_s} (AD_{cant,opt} - 2\rho t_{cant}). \tag{41}$$

where the optimal enhancement factor of spring constant as $$EF_{k,opt} = \frac{3\sqrt{\eta}}{2\sqrt{5E}} \frac{\rho_s^2 L_{cant} t_{cant}(AD_{cant,opt} - 2\rho_s t_{cant})}{AD_{cant,opt}^3}. \tag{42}$$

To find the maximum enhancement factor of spring constant in terms of the optimal areal density, the maximum enhancement factor is determined as $$EF_{k,max} = \frac{\sqrt{\eta}}{18\sqrt{5E}} \frac{L_{cant}}{t_{cant}} \tag{43}$$

When $$AD_{cant,opt}|_{EF_{k,max}} = 3\rho_s t_{cant}. \tag{44}$$

Note that Equation is affected by the term $AD_{cant,opt} - 2\rho t_{cant}$. According to Equation 25, the term refers to the areal density of the cantilever core $AD_{cant}^c$ while $2\rho t_{cant}$ represents the areal density of the cantilever face sheets $AD_{cant}^f$, which can be expressed as $$AD_{cant}^c = AD_{cant} - AD_{cant}^f = AD_{cant} - 2\rho_s t_{cant} \tag{45}$$

Taking Equation 13 into Equation 14, $$AD_{cant,opt}^c = \rho_s t_{cant}. \tag{46}$$

Therefore, the ratio of the face sheets areal density to the core areal density for the optimal cantilever is $$\left.\frac{AD_{cant}^f}{AD_{cant}^c}\right|_{opt} = 2. \tag{47}$$

The optimal areal density ratio in Equation 44 is identical to the optimal weight ratio of the face weight to the core weight for the optimal web-core sandwich structures. This is because the rectangle width of the cantilever is assumed zero, i.e., $w_{rect} = 0$, which results in the face areal density equivalent to the areal density of the web-core sandwich structures. However, the bending stiffness of the cantilever is still 30% of the ideal sandwich beam as discussed in Equation 31, given the cuts of the basketweave pattern on the face sheets.

The maximum enhancement factor of the spring constant is $$EF_{k,max} \approx 0.0982 \frac{L_{cant}}{t_{cant}} \tag{48}$$

for our alumina cantilevers with the geometric and material properties summarized in Table 2. The maximum optimal cantilever height and rectangle length are $$\begin{cases} h_{cant,max} \approx 1.716\sqrt{L_{cant}t_{cant}} \\ l_{rect,max} \approx 3.432\sqrt{L_{cant}t_{cant}} \end{cases} \quad (49)$$

Geometric and material properties of the analytically modeled cantilever are: $L_{cant}$: 2-10 mm, $t_{cant}$: 50 nm, $w_{rect}$: 0 μm, $$g_{rect}: \frac{l_{rect}}{2},$$

$W_{cant}$: 500 μm, η: 2030 GPa, E: 130 GPa, $\rho_s$: 3900 kg m$^{-3}$

TABLE 4

List of Nomenclature

| | | Cantilever | Solid beam | Ideal sandwich |
|---|---|---|---|---|
| Full-size beam | Length | $L_{cant}$ | $L_{solid}$ | $L_{ideal}$ |
| | Height | $h_{cant}$ | $h_{solid}$ | $h_{ideal}$ |
| | Thickness | $t_{cant}$ | $t_{solid}$ | $t_{ideal}$ |
| | Width | $W_{cant}$ | $W_{solid}$ | $W_{ideal}$ |
| Rectangles in face sheets | Length | $l_{rect}$ | — | — |
| | Width | $w_{rect}$ | — | — |
| | Gap | $g_{rect}$ | — | — |
| Material properties | Young's modulus | | E | |
| | Shear modulus | | G | |
| | Solid volumetric density | | $\rho_s$ | |
| | Poisson's ratio | | v | |
| Mechanical properties | Areal density | $AD_{cant}$ | $AD_{solid}$ | $AD_{ideal}$ |
| | Bending stiffness (a.k.a. flexural modulus) | $D_{cant}$ | $D_{solid}$ | $D_{ideal}$ |
| | Apparent bending stiffness | $D_{app}$ | — | — |
| | True bending stiffness along the length of cantilever | $D_{xx}$ | — | — |
| | Spring constant | $k_{cant}$ | $k_{solid}$ | $k_{ideal}$ |
| Comparison | Enhancement factor for bending stiffness | | $EF_b$ | |
| | Enhancement factor for spring constant | | $EF_k$ | |

The present disclosure is well adapted to attain the ends and advantages mentioned as well as those that are inherent therein. The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above can be altered or modified and all such variations are considered within the scope and spirit of the present disclosure.

What is claimed is:

1. A nanocardboard structure comprising:
   at least two parallel planar films separated from each other by a gap of from about 0.1 micrometers to about 1000 micrometers; and
   a webbing disposed between the at least two parallel planar films, wherein the at least two parallel planar films comprise perforations that match a cross section of the webbing, wherein the nanocardboard including the webbing is fabricated as a monolithic structure.

2. The nanocardboard structure of claim 1, wherein the webbing is configured such that any line lying in a plane of one of the at least two parallel planar films intersects the webbing to prevent wrinkling.

3. The nanocardboard structure of claim 1, wherein the at least two parallel planar films and the webbing are configured to recover the nanocardboard structure from bending deformation without damage.

4. The nanocardboard structure of claim 1, wherein the webbing forms a basketweave motif.

5. The nanocardboard structure of claim 1, wherein the webbing comprises a hexagonal array of cylinders.

6. The nanocardboard structure of claim 1, wherein the nanocardboard structure is electrically insulating or thermally insulating.

7. The nanocardboard structure of claim 1, wherein the nanocardboard structure is configured as a thermal transpiration membrane.

8. The nanocardboard structure of claim 7, wherein the thermal transpiration membrane creates an overpressure by generating a temperature difference across the membrane.

9. The nanocardboard structure of claim 8, wherein the temperature difference is generated by a natural source of energy.

10. The nanocardboard structure of claim 1, wherein one side of the nanocardboard structure is clamped on a surface to form a cantilever.

11. The nanocardboard structure of claim 10, wherein the cantilever is configured as a scanning probe for scanning probe microscopy.

12. The nanocardboard structure of claim 1, wherein the webbing forms a motif that comprises a plurality of parallel channels.

13. The nanocardboard structure of claim 1, wherein the nanocardboard is coated on at least on side with a polymer layer.

14. The nanocardboard structure of claim 13, wherein a thickness of the polymer layer ranges from about 10 nm to about 1000 nm.

15. The nanocardboard structure of claim 14, wherein the polymer thickness is about 500 nm.

* * * * *